US012781815B2

(12) United States Patent
Yang et al.

(10) Patent No.: US 12,781,815 B2
(45) Date of Patent: Nov. 3, 2026

(54) TRANSMISSION DEVICE WITH REVERSE BRAKING FUNCTION, JOINT MODULE, AND ROBOTIC ARM

(71) Applicant: T-MAX (HANGZHOU) TECHNOLOGY CO., LTD., Hangzhou (CN)

(72) Inventors: Huizhong Yang, Hangzhou (CN); Yilin Yang, Hangzhou (CN); Zhaobo Qing, Hangzhou (CN)

(73) Assignee: T-MAX (HANGZHOU) TECHNOLOGY, CO., LTD., Zhejiang (CN)

( * ) Notice: Subject to any disclaimer, the term of this patent is extended or adjusted under 35 U.S.C. 154(b) by 136 days.

(21) Appl. No.: 18/800,903

(22) Filed: Aug. 12, 2024

(65) Prior Publication Data

US 2025/0230847 A1 Jul. 17, 2025

(51) Int. Cl.

| | |
|---|---|
| ***B25J 19/00*** | (2006.01) |
| ***F16D 59/00*** | (2006.01) |
| ***F16D 65/22*** | (2006.01) |
| *F16D 121/16* | (2012.01) |

(52) U.S. Cl.

CPC .......... *F16D 59/00* (2013.01); *B25J 19/0004* (2013.01); *F16D 65/22* (2013.01); *F16D 2121/16* (2013.01)

(58) Field of Classification Search

CPC ...... B25J 19/0004; F16D 59/00; F16D 65/22; F16D 2121/16; F16D 59/02; F16D 51/12; F16H 2025/2463

See application file for complete search history.

(56) References Cited

U.S. PATENT DOCUMENTS 10,919,159 B2 * 2/2021 Kassow ............... B25J 19/0004
2023/0119123 A1 * 4/2023 Storck ..................... F16D 13/16 188/342

FOREIGN PATENT DOCUMENTS

| | | | |
|---|---|---|---|
| CN | 101379318 | A | 3/2009 |
| CN | 106494273 | A | 3/2017 |
| CN | 107559388 | A | 1/2018 |
| CN | 115571028 | A | 1/2023 |
| CN | 218228728 | U | 1/2023 |
| CN | 116439933 | A | 7/2023 |
| JP | 2018096386 | A | 6/2018 |

OTHER PUBLICATIONS

International Search Report and Written Opinion of the International Searching Authority for PCT International Application No. PCT/CN2024/075476 mailed Apr. 4, 2024, 20 pages with English translation.

* cited by examiner

*Primary Examiner* — Gregory Robert Weber

(74) *Attorney, Agent, or Firm* — Ashurst Perkins Coie US LLP

(57) ABSTRACT

In some aspects, a transmission device with a reverse braking function includes a housing seat having a seat hole; a driven shaft rotatably and at least partially supported in the seat hole; a brake block arranged on the driven shaft and rotatable together with the driven shaft, the brake block being movable relative to the driven shaft between a braking position where the brake block abuts against the housing seat and a release position where the brake block is separated from the housing seat; an elastic member coupled to the driven shaft and the brake block and configured to press the brake block towards the braking position; and a drive member coupled to the driven shaft.

20 Claims, 19 Drawing Sheets

TRANSMISSION DEVICE WITH REVERSE BRAKING FUNCTION, JOINT MODULE, AND ROBOTIC ARM

CROSS-REFERENCE TO RELATED APPLICATIONS

This patent document claims priority to and benefits of Chinese Patent Application No. 202410064039.3, filed on Jan. 16, 2024, the entire contents of which are incorporated by reference for all purposes.

TECHNICAL FIELD

The present technology relates to the field of transmission technology and, more particularly, to a transmission device with a reverse braking function, a joint module, and a robotic arm.

BACKGROUND

For electromechanical equipment such as cranes, drive joints of robots, and winches, an output end of a motor will rotate under action of a load, like gravity, when the motor is de-energized. Conventionally, an electromagnetic brake is usually mounted on a motor shaft of the motor to provide braking force to prevent the electromechanical equipment from rotating after the power is cut off. In addition, existing electromechanical equipment uses mechanisms such as worm gear pairs to achieve braking. However, conventional braking methods have problems such as complex structures, a large number of parts, large volumes, small braking torques, large consumption of braking friction, high cost, and low braking reliability. A new mechanism is needed to alleviate such problems for electromechanical equipment and improve the cost and reliability of braking for such equipment.

SUMMARY

Disclosed is transmission device with a reverse breaking function, in accordance with the present technology, which alleviates the aforementioned problems and provides advantages and benefits that improve braking functionality of electromechanical equipment such as drive joints (e.g., of robots) and/or other equipment.

In some aspects, a transmission device with a reverse braking function according to embodiments of the present technology includes a housing seat having a seat hole; a driven shaft rotatably and at least partially supported in the seat hole; a brake block arranged on the driven shaft and rotatable together with the driven shaft, the brake block being movable relative to the driven shaft between a braking position where the brake block abuts against the housing seat and a release position where the brake block is separated from the housing seat; an elastic member coupled to the driven shaft and the brake block and configured to press the brake block towards the braking position; and a drive member coupled to the driven shaft. When the drive member rotates, the brake block moves to the release position relative to the driven shaft so that the drive member drives the driven shaft and the brake block to rotate together, and when the drive member stops rotating, the elastic member pushes the brake block to the braking position to prevent the driven shaft and the brake block from rotating together.

In some aspects, a transmission device according to embodiments of the present technology includes a driven member; a brake member arranged on the driven shaft and rotatable together with the driven shaft, the brake member being movable relative to the driven member between a braking position that prevents the driven member from rotating together with the brake member and a release position that allows the driven member to rotate together with the brake member; an elastic member configured to press the brake member towards the braking position; and a drive member configured to drive the driven member to rotate. When the drive member rotates, the brake member overcomes an elastic force of the elastic member and moves relative to the driven member from the braking position to the release position so that the drive member drives the driven member to rotate together with the brake member; and when the drive member stops rotating, the elastic member pushes the brake member from the release position to the braking position.

In some aspects, a transmission device according to embodiments of the present technology includes a rotatable driven member; a brake member arranged on the driven member, the brake member being movable relative to the driven member between a braking position that prevents the driven member from rotating and a release position that allows the driven member to rotate, wherein in a radial direction of the driven member, the brake member when in the braking position is further away from a rotation center of the driven member than when in the release position; or when the brake member moves from the release position towards the braking position, the brake member moves along a circumferential direction of the driven member and moves outwards along the radial direction of the driven member at the same time; or when the brake member moves from the release position towards the braking position, a motion trajectory of the brake member is a spiral or a cam contour gradually expanding radially outwards along the circumferential direction of the driven member; a spring, having a first end coupled to the brake member and a second end coupled to the driven member and configured to press the brake member towards the braking position; and a rotatable drive member. When the drive member rotates, the drive member causes the brake member to move from the braking position to the release position against an elastic force of the spring to drive the driven member to rotate together with the brake member, and when the drive member stops rotating, the spring pushes the brake member from the release position to the braking position to prevent the driven member from rotating together with the brake member.

DETAILED DESCRIPTION

Figure 1:
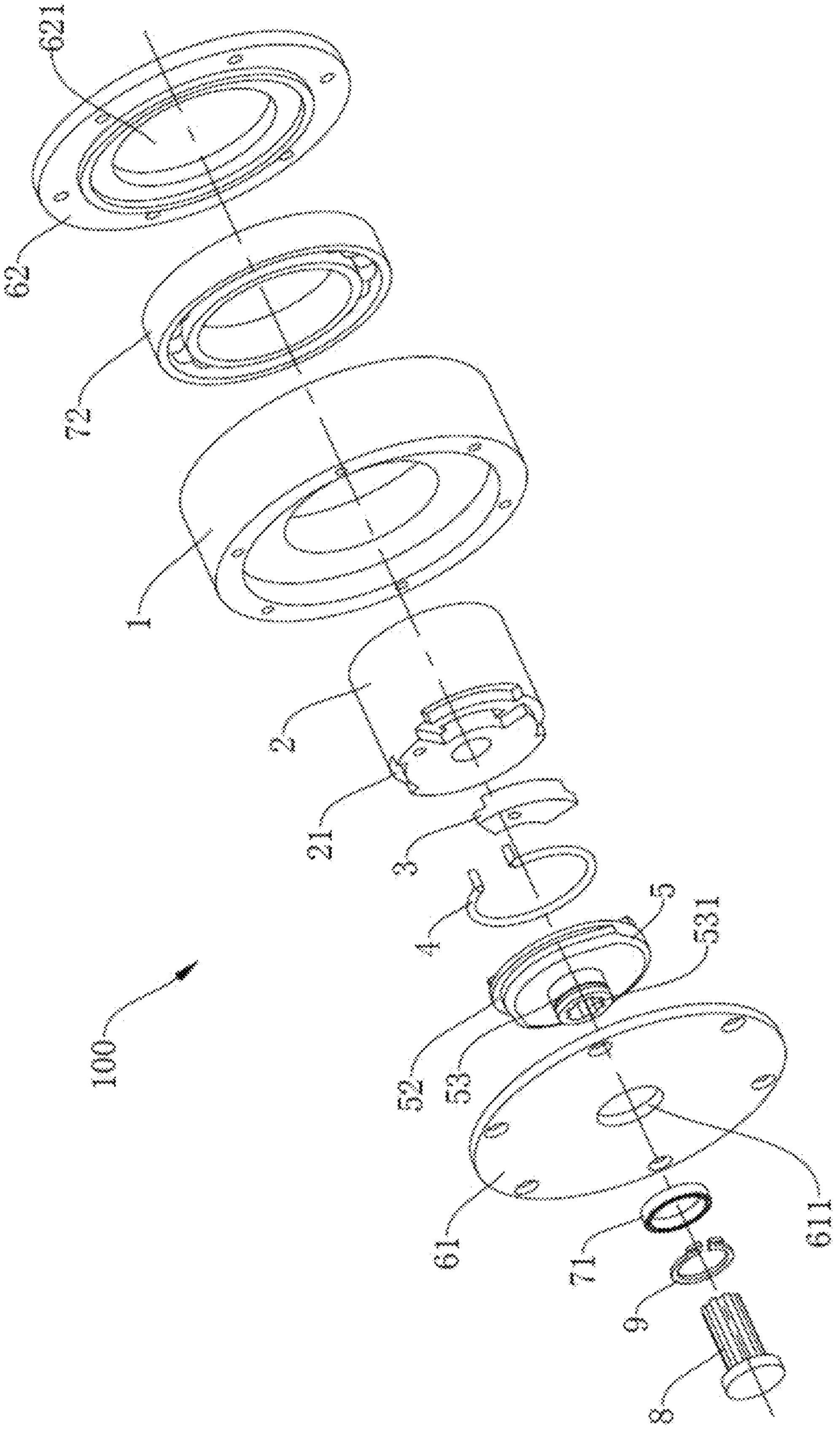
FIG. 1 is a perspective view of a transmission device with a reverse braking function according to embodiments of the present technology.

Embodiments of the present technology are described in detail below, examples of which are shown in the accompanying drawings. The following embodiments described with reference to the accompanying drawing are illustrative. It should be understood that the embodiments described are intended to explain the present technology rather than limit the present technology.

Disclosed is transmission device with reverse breaking, in accordance with the present technology, which can improve braking functionality of electromechanical equipment such as drive joints (e.g., of robots) and/or other equipment. Example embodiments of the disclosed transmission device and electromechanical equipment that can employ the transmission device are described below.

As shown in FIG. 1 to FIG. 14, a transmission device 100 with reverse braking according to embodiments of the present technology includes a housing seat 1, a driven shaft 2, a brake block 3, an elastic member 4, and a drive member 5.

Figure 3:
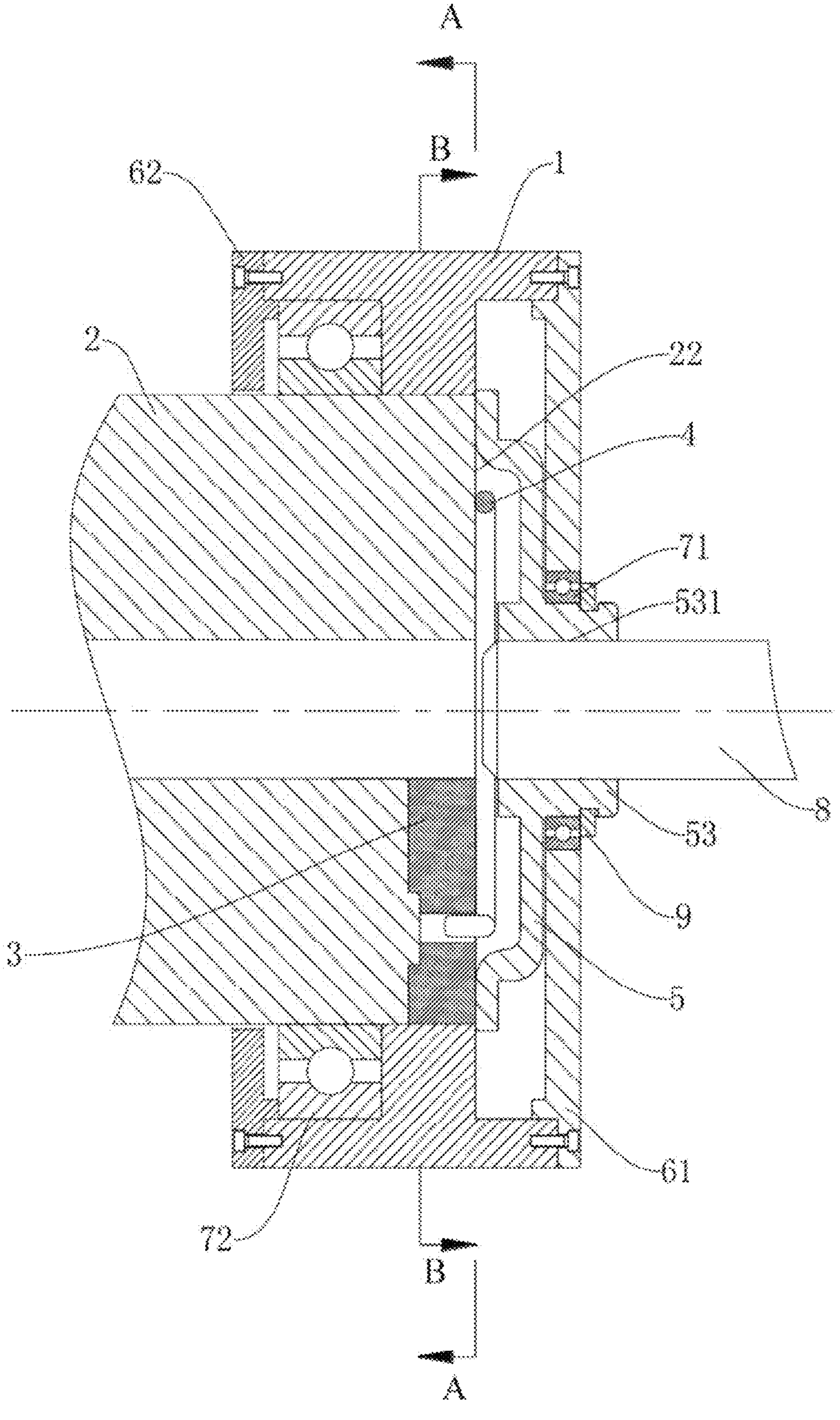
FIG. 3 is a partial sectional view of a transmission device with a reverse braking function according to embodiments of the present technology.

In some embodiments of the transmission device 100, for example, the housing seat 1 has a seat hole 11 (shown in FIG. 4) that can penetrate the housing seat 1 along an axial direction of the housing seat 1 (for example, a left and right direction in FIG. 3). The driven shaft 2 is rotatably and at least partially supported in the seat hole 11 (shown in FIG. 3, for example). The brake block 3 is arranged on the driven shaft 2 and can rotate together with the driven shaft 2. The brake block 3 is movable with respect to the driven shaft 2 between a braking position (e.g., a position shown in FIG. 7, for example) and a release position (e.g., a position shown in FIG. 8 and FIG. 9, for example). In the braking position, the brake block 3 abuts against the housing seat 1. In the release position, the brake block 3 is separated from the housing seat 1.

The elastic member 4 is coupled to the driven shaft 2 and the brake block 3, which is configured to press the brake block 3 towards the braking position. In other words, the elastic member 4 applies elastic force to the brake block 3, and the elastic force of the elastic member 4 presses the brake block 3 towards the braking position. For example, during the movement of the brake block 3 from the braking position towards the release position, the elastic member 4 is gradually compressed; thereby, the elastic member 4 applies the elastic force to the brake block 3, and the elastic force presses the brake block 3 towards the braking position. It should be understood that the embodiments of the present technology are not limited to this. For example, the elastic member may also be gradually stretched.

The drive member 5 is coupled to the driven shaft 2, and the drive member 5 is configured to drive the driven shaft 2. When the drive member 5 rotates, the brake block 3 may overcome the elastic force of the elastic member 4 and move to the release position with respect to the driven shaft 2, and the brake block 3 is separated from the housing seat 1; thereby, the drive member 5 may drive the driven shaft 2 and the brake block 3 to rotate together. When the drive member 5 stops rotating, the elastic member 4 pushes the brake block 3 to the braking position relative to the driven shaft 2, and the brake block 3 abuts against the housing seat 1, thereby preventing the driven shaft 2 and the brake block 3 from rotating together. In other words, when the drive member 5 rotates, the brake block 3 moves to the release position, and the drive member 5 may drive the driven shaft 2 and the brake block 3 to rotate together. When the drive member 5 stops rotating, the brake block 3 moves to the braking position, and the brake block 3 abuts against the housing seat 1, and at this time, even if the load (torque) is applied to the driven shaft 2, the driven shaft 2 cannot rotate together with the brake block 3, so the driven shaft 2 cannot transmit the load to the drive member 5 in reverse; thus, the reverse braking function is realized.

For example, the drive member 5 may be coupled to a drive shaft 8 to be driven by the drive shaft 8 to rotate in a first direction (e.g., a counterclockwise direction) or in a second direction (e.g., a clockwise direction). For example, the drive shaft 8 may be a shaft of an actuator or a shaft coupled to the shaft of the actuator. For example, the actuator may be a motor.

When the drive member 5 is driven to rotate by the motor, it may make the brake block 3 overcome the elastic force of the elastic member 4 and move to the release position with respect to the driven shaft 2 to be separated from the housing seat 1, and then the drive member 5 may drive the brake block 3 to rotate together with the driven shaft 2. The driven shaft 2 may also be called an output shaft of the transmission device 100, and the driven shaft 2 may be coupled to other parts to drive other moving parts to rotate. For example, the driven shaft 2 may be configured to drive a drum of a winch, a joint of a robot, etc.

When the motor is powered off and stops, the drive member 5 no longer rotates, the brake block 3 moves to the braking position relative to the driven shaft 2 under the elastic force of the elastic member 4 and abuts against the housing seat 1, and the friction force between the brake block 3 and the housing seat 1 prevents the driven shaft 2 and the brake block 3 from rotating together.

The transmission device according to example embodiments of the present technology can automatically realize reverse braking. When the drive member rotates, first the brake block overcomes the elastic force of the elastic member and moves to the release position relative to the driven shaft to be separated from the housing seat; then, the drive member drives the driven shaft and the brake block to rotate together. When the drive member stops rotating, the elastic member pushes the brake block from the release position to the braking position relative to the driven shaft, and the brake block abuts against the housing seat, thereby preventing the driven shaft and the brake block from rotating together. That is, the driven shaft cannot rotate under action of the torque (load) applied to it, so the driven shaft cannot reversely transmit the torque to the drive member to make the drive member rotate. For example, when a motor of a winch stops rotating, a load applied to the driven shaft by a drum of the winch cannot drive the driven shaft to rotate, and thus the driven shaft cannot rotate the drive member.

The transmission device according to example embodiments of the present technology may realize the automatic reverse braking function with a simple overall structure, a small number of parts, and a small volume and has the advantages of large braking torque, small consumption of braking friction, low cost, and high braking reliability.

It should be understood that in the example embodiments of the present technology, "reverse" in "reverse braking" refers to a direction in which the torque (load, driving force) applied to the driven shaft is transmitted towards the drive member and, correspondingly, "forward" refers to a direction in which the torque (driving force) of the drive member is transmitted towards the driven shaft.

The transmission device according to example embodiments of the present technology may realize the automatic reverse braking function with an overall structure that is simple, a number of parts that are small, and a volume that is small, and it has the advantages of large braking torque, small braking friction consumption, low cost, and high braking reliability.

In some embodiments, as shown in FIGS. 1 to 2 and 5 to 12, the driven shaft 2 has a toggle slot 21, and the drive member 5 is provided with a toggle block 51. The toggle block 51 is fitted in the toggle slot 21 and is movable along a circumferential direction of the driven shaft 2 in the toggle slot 21.

Figure 8:
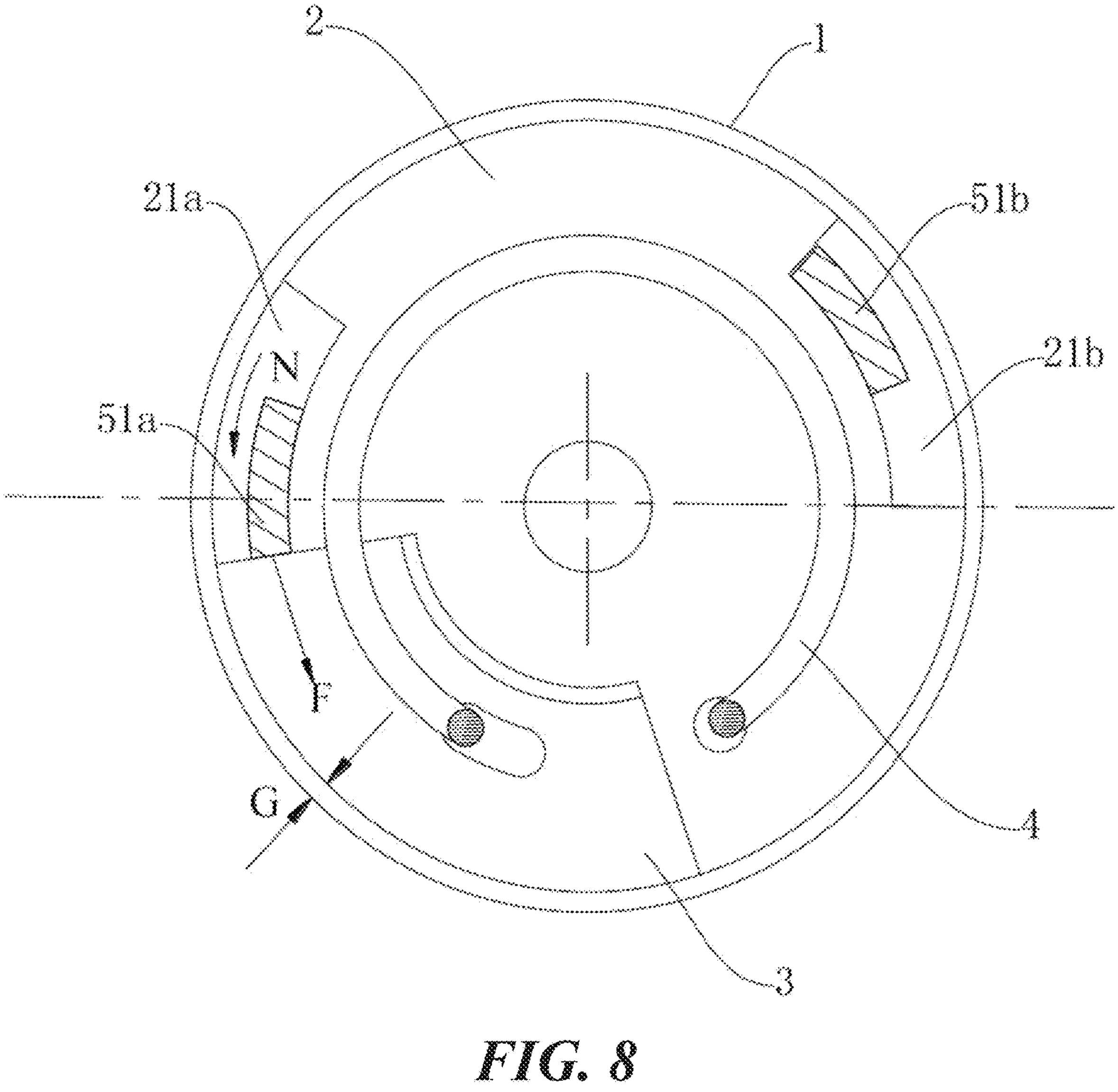
FIG. 8 is a schematic diagram showing that a brake block of a transmission device with a reverse braking function according to embodiments of the present technology is in a release position and a drive member of the transmission device rotates in a counterclockwise direction.

In some examples, as shown in FIG. 8, when the drive member 5 rotates in the counterclockwise direction, the toggle block 51 overcomes the elastic force of the elastic member 4 and pushes the brake block 3 to the release position to drive the brake block 3 and the driven shaft 2 to rotate together. In other words, the drive member 5 pushes the brake block 3 through the toggle block 51 so that the brake block 3 overcomes the elastic force of the elastic member 4 and moves to the release position relative to the driven shaft 2, and then drives the driven shaft 2 and the brake block 3 to rotate together through the toggle block 51.

Figure 9:
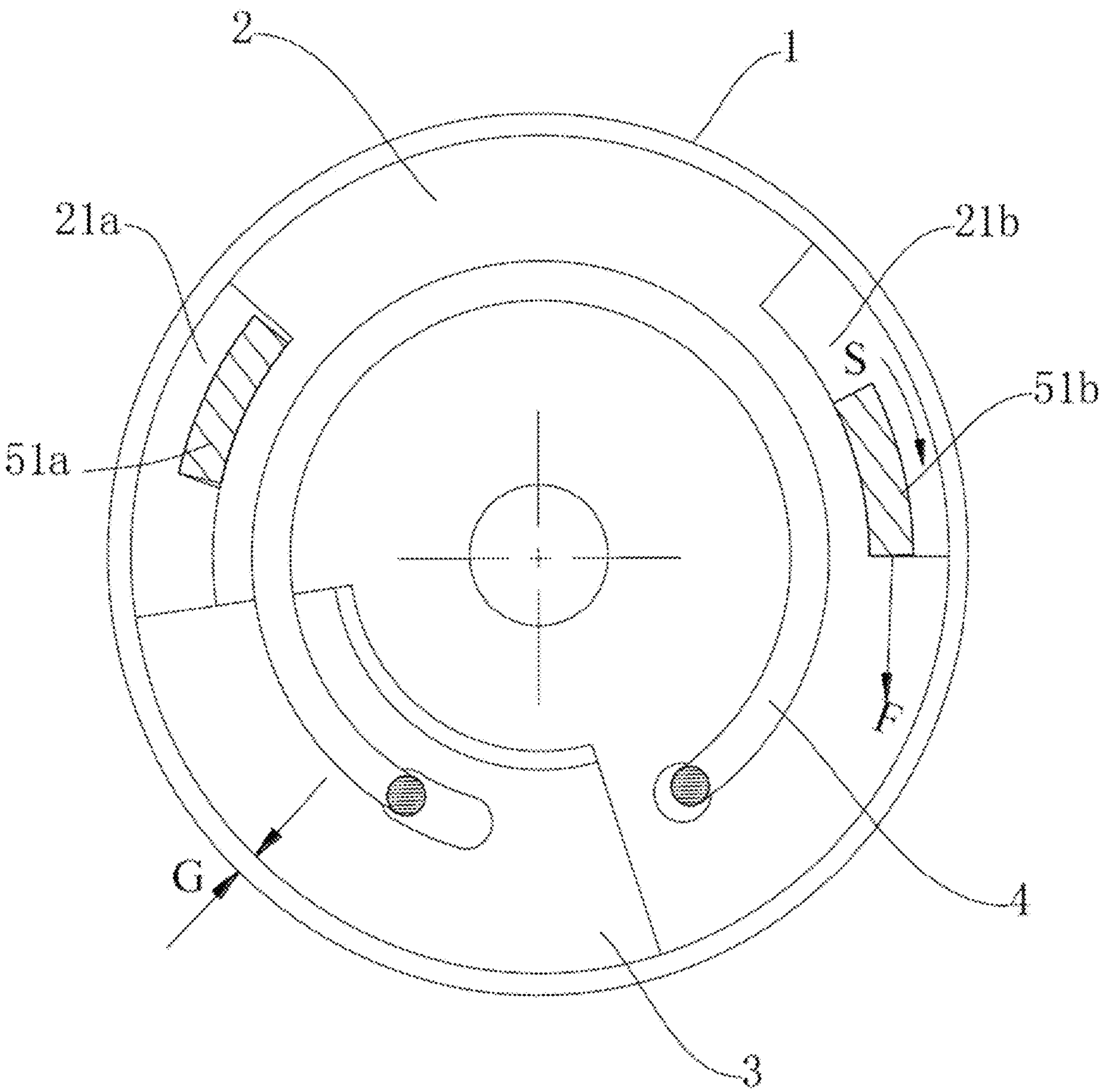
FIG. 9 is a schematic diagram showing that a brake block of a transmission device with a reverse braking function according to embodiments of the present technology is in a release position and a drive member of the transmission device rotates in a clockwise direction.

In other examples, as shown in FIG. 9, when the drive member 5 rotates in the clockwise direction, the toggle block 51 drives the driven shaft 2 to rotate, and the relative rotation occurs between the driven shaft 2 and the brake block 3, whereby the brake block 3 overcomes the elastic force of the elastic member 4 and moves to the release position, and then the toggle block 51 drives the driven shaft 2 and the brake block 3 to rotate together. In other words, the drive member 5 drives the driven shaft 2 to rotate through the toggle block 51, whereby the brake block 3 overcomes the elastic force of the elastic member 4 and moves to the release position, and then applies force to the driven shaft 2 through the toggle block 51 to drive the driven shaft 2 and the brake block 3 to rotate together.

In some embodiments, as shown in FIGS. 1 to 2 and FIGS. 5 to 9, the toggle slot 21 includes a first toggle slot 21*a* and a second toggle slot 21*b*, and the toggle block 51 includes a first toggle block 51*a* and a second toggle block 51*b*. The first toggle block 51*a* is fitted in the first toggle slot 21*a* and is movable along the circumferential direction of the driven shaft 2, and the second toggle block 51*b* is fitted in the second toggle slot 21*b* and is movable along the circumferential direction of the driven shaft 2, in which the brake block 3 corresponds to the first toggle slot 21*a*; that is, when the drive member 5 rotates counterclockwise, the first toggle block 51*a* fitted in the first toggle slot 21*a* drives the brake block 3.

Figure 7:
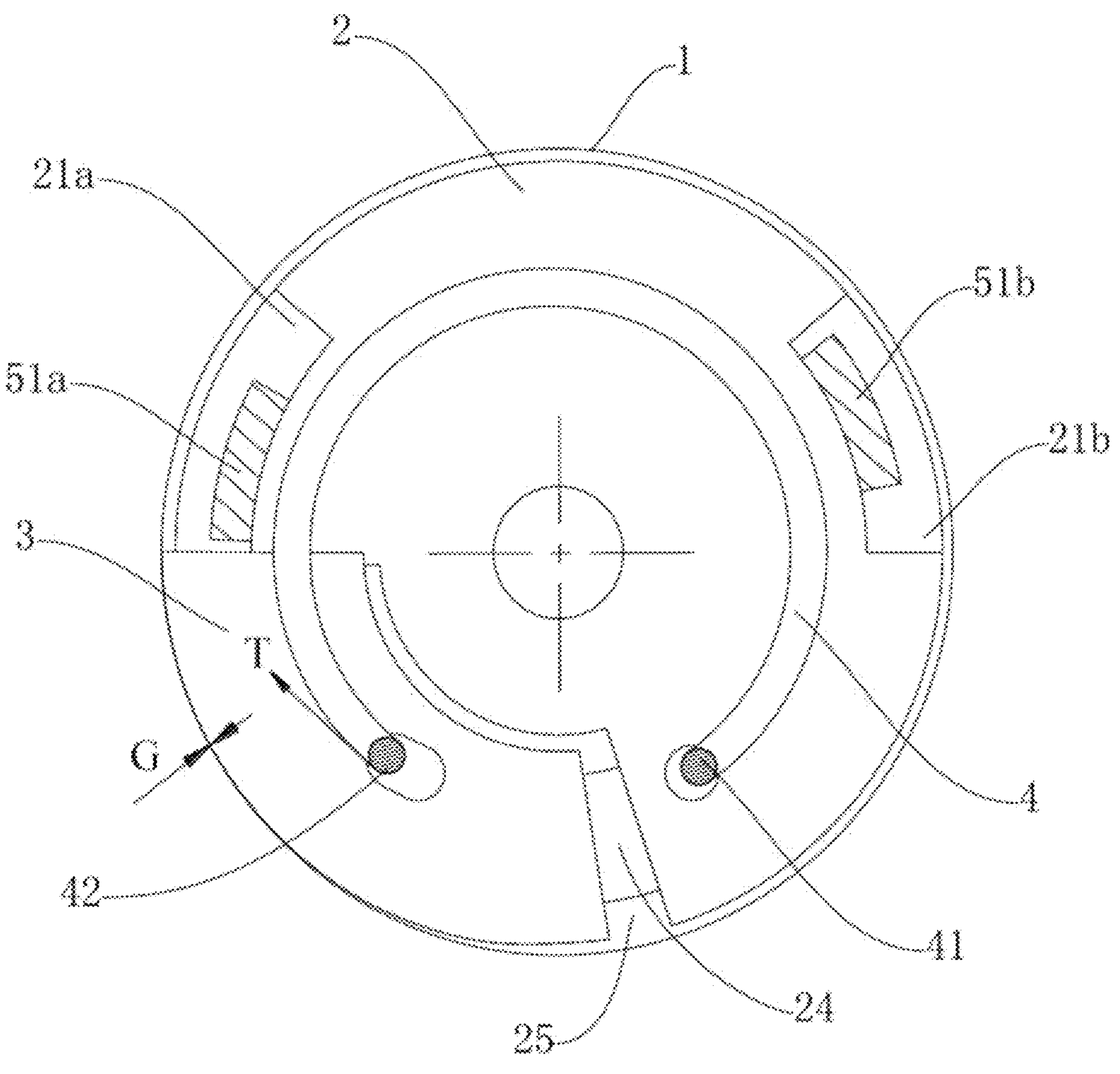
FIG. 7 is a schematic diagram showing that a brake block of a transmission device with a reverse braking function according to embodiments of the present technology is in a braking position.

Specifically, as shown in FIG. 7 and FIG. 8, in FIG. 7, the brake block 3 is in the braking position, the brake block 3 abuts against the housing seat 1, a minimum gap G therebetween is zero, the drive member 5 rotates along the first direction (for example, a counterclockwise direction N), and the first toggle block 51*a* moves along the circumferential direction of the driven shaft 2 in the first toggle slot 21*a* in the counterclockwise direction N until it is in contact with an end face of the brake block 3 (an upper end face in FIG. 7); further, the first toggle block 51*a* applies thrust F to the brake block 3 to overcome the elastic force T of the elastic member 4 and pushes the brake block 3 to the release position shown in FIG. 8, the brake block 3 is separated from the housing seat 1, the minimum gap G therebetween is greater than zero, and then the first toggle block 51*a* pushes the brake block 3 and the driven shaft 2 to rotate together along the counterclockwise direction N.

As shown in FIG. 8, in the process that the first toggle block 51*a* pushes the brake block 3 from the braking position to the release position, the second toggle block 51*b* rotates in the counterclockwise direction in the second toggle slot 21*b*, and when the brake toggle 3 reaches the release position, the second toggle block 51*b* is spaced apart from an end wall surface of the second toggle slot 21*b* (an upper end wall surface in FIG. 8). In some embodiments, the second toggle block 51*b* can be in contact with the end wall surface of the second toggle slot 21*b*, and the second toggle block 51*b* cannot apply force to the driven shaft 2. The driven shaft 2 and brake block 3 rotate together in the counterclockwise direction N under the action of the first toggle block 51*a*; thus, the machining accuracy and assembly accuracy requirements of the drive member 5 and the driven shaft 2 are low, and the cost is low.

In some embodiments, when the drive member 5 rotates in the second direction opposite to the first direction, the second toggle block 51*b* drives the driven shaft 2 to rotate in the second direction, and the brake block 3 overcomes the elastic force of the elastic member 4 and moves to the release position.

Specifically, as shown in FIG. 7 and FIG. 9, in FIG. 7, the brake block 3 is in the braking position, the brake block 3 abuts against the housing seat 1, the minimum gap G therebetween is zero, the drive member 5 rotates along the second direction (a clockwise direction S), the second toggle block 51*b* rotates along the circumferential direction of the driven shaft 2 in the second toggle slot 21*b* in the clockwise direction S until it is in contact with an end face of the second toggle slot 21*b* (a lower end face in FIG. 9), the second toggle block 51*b* applies the thrust F to the driven shaft 2 to push the driven shaft 2 to rotate in the clockwise direction S, the relative rotation occurs between the driven shaft 2 and the brake block 3, and the brake block 3 overcomes the elastic force T of the elastic member 4 and moves to the release position. Subsequently, the second toggle block 51*b* drives the driven shaft 2 and brake block 3 to rotate together in the clockwise direction S.

As shown in FIG. 9, when the brake block 3 overcomes the elastic force of the elastic member 4 and moves from the braking position to the release position, the first toggle block 51*a* is spaced apart from an end wall surface of the first toggle slot 21*a* (an upper end wall surface in FIG. 9). In some embodiments, the first toggle block 51*a* is in contact with the end wall surface of the first toggle slot 21*a*, but the first toggle block 51*a* may not apply force on the driven shaft 2, and the driven shaft 2 and the brake block 3 rotate together along the clockwise direction under the action of the second toggle block 51*b*.

In some specific examples, as shown in FIGS. 1 to 14, there is one first toggle slot 21*a*, one second toggle slot 21*b*, one first toggle block 51*a*, one second toggle block 51*b*, one brake block 3, and one elastic member 4. The first toggle block 51*a* is fitted in the first toggle slot 21*a* and corresponds to the brake block 3, and the second toggle block 51*b* is fitted in the second toggle slot 21*b* and does not correspond to the brake block 3; that is, the second toggle block 51*b* is not in direct contact with the brake block 3.

In an optional embodiment, the first toggle slot 21*a*, the second toggle slot 21*b*, the first toggle block 51*a*, the second toggle block 51*b*, the brake block 3, and the elastic member 4 each may be a plurality.

Figure 2:
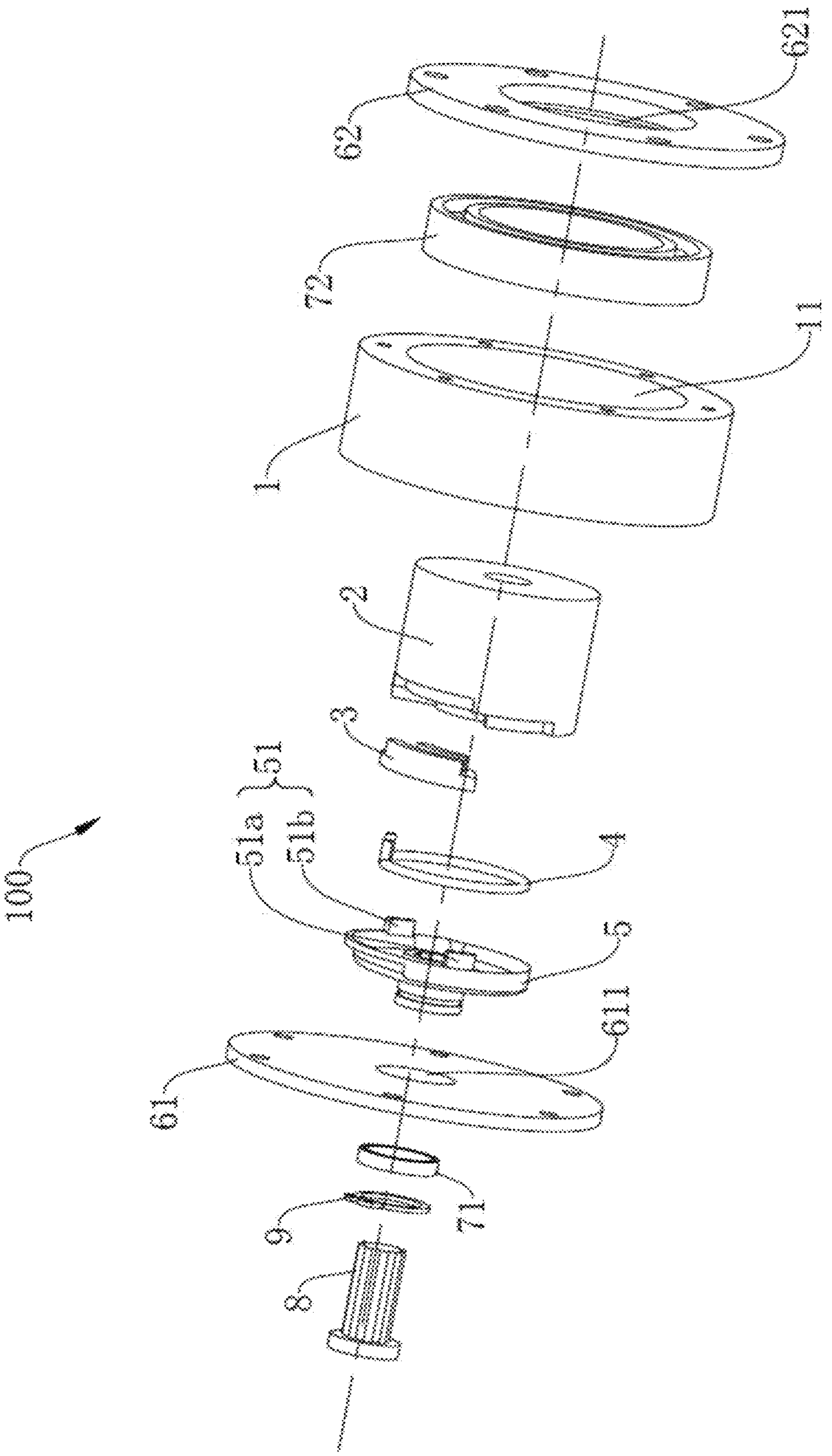
FIG. 2 is another perspective view of a transmission device with a reverse braking function according to embodiments of the present technology.

In some embodiments, as shown in FIGS. 1 to 3, the driven shaft 2 has a first end 22 (a left end in FIG. 1) and a second end (a right end in FIG. 1) along its axis. The first end 22 of the driven shaft 2 is adjacent to the drive member 5, and the second end of the driven shaft 2 can be coupled to a driven component such as the drum of the winch. In an example shown in FIGS. 1 to 3, the driven shaft 2 is a hollow shaft, which has a central through hole extending along its axis, and the central through hole can be configured to connect with other components, but the embodiments of the present technology are not limited to this.

The toggle slot 21 is formed at a junction between an end face of the first end 22 of the driven shaft 2 and an outer peripheral surface of the driven shaft 2; that is, the toggle slot 21 is at an edge of the end face of the first end 22 of the driven shaft 2, and the outer peripheral surface and an upper surface of the toggle slot 21 (a surface corresponding to the end face of the first end of the driven shaft) are open. The toggle slot 21 is recessed from the end face of the first end 22 of the driven shaft 2 towards the second end of the driven shaft 2, and the toggle block 51 of the drive member 5 extends into and fits in the toggle slot 21 along the axis of the driven shaft 2 from the first end 22 of the driven shaft 2. The toggle slot 21 extends along the circumferential direction of the driven shaft 2; specifically, the toggle slot 21 is arc-shaped.

Figure 10:
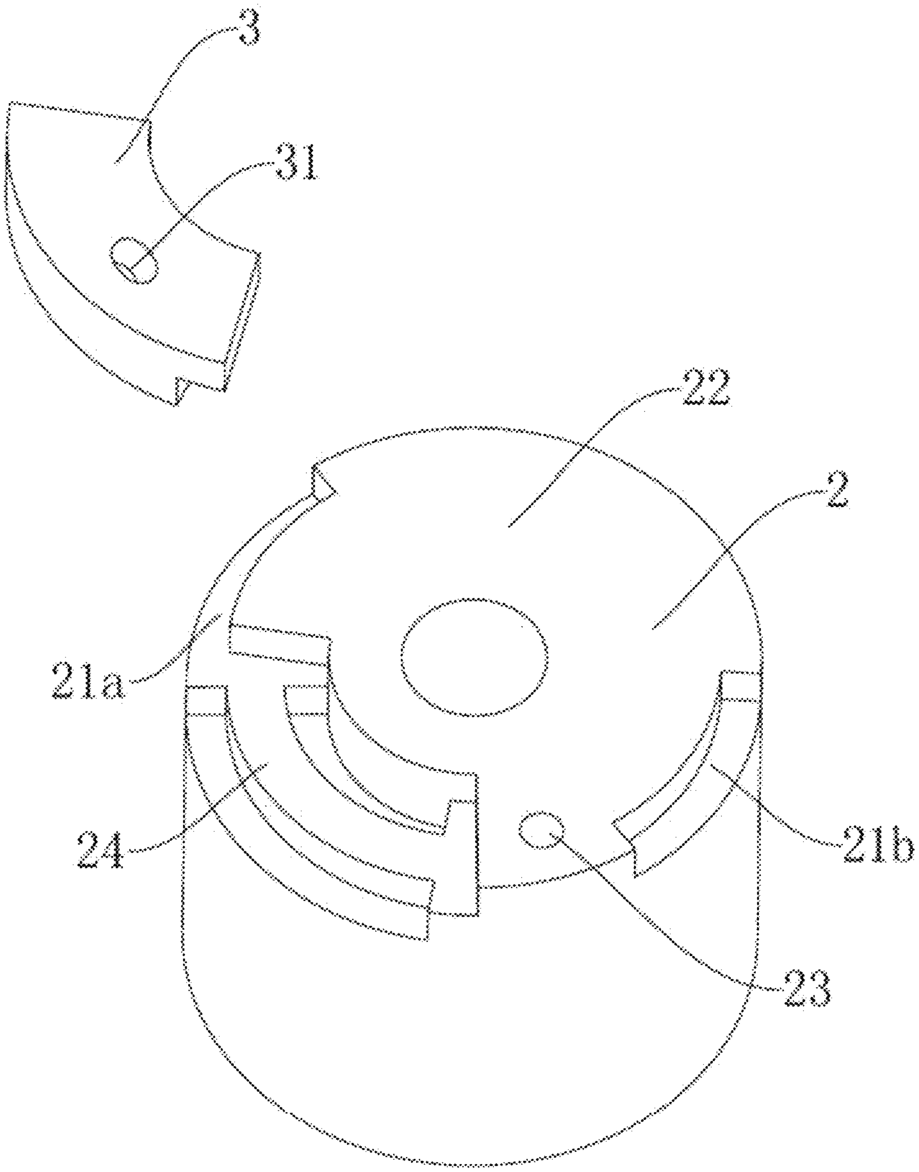
FIG. 10 is a perspective view of a brake block and a driven shaft of a transmission device with a reverse braking function according to embodiments of the present technology.
Figure 11:
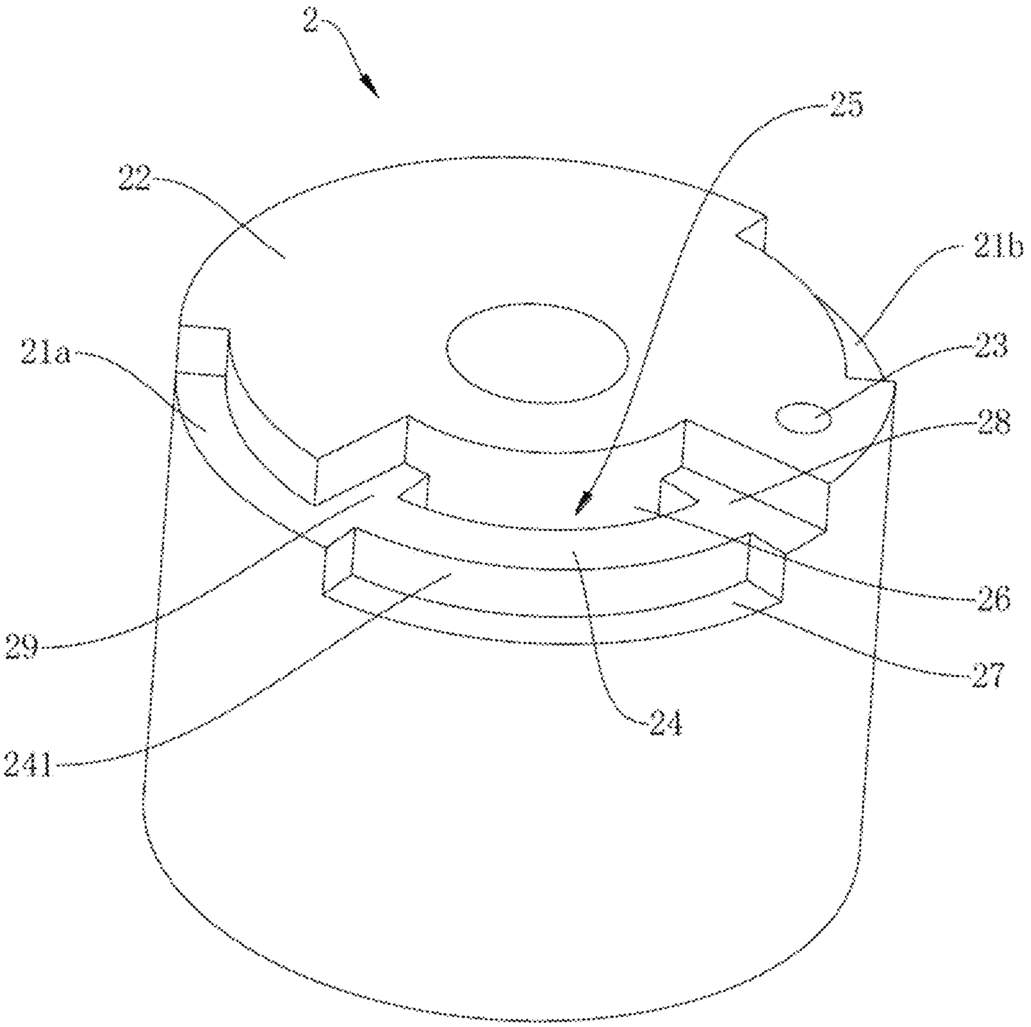
FIG. 11 is a perspective view of a driven shaft of a transmission device with a reverse braking function according to embodiments of the present technology.
Figure 12:
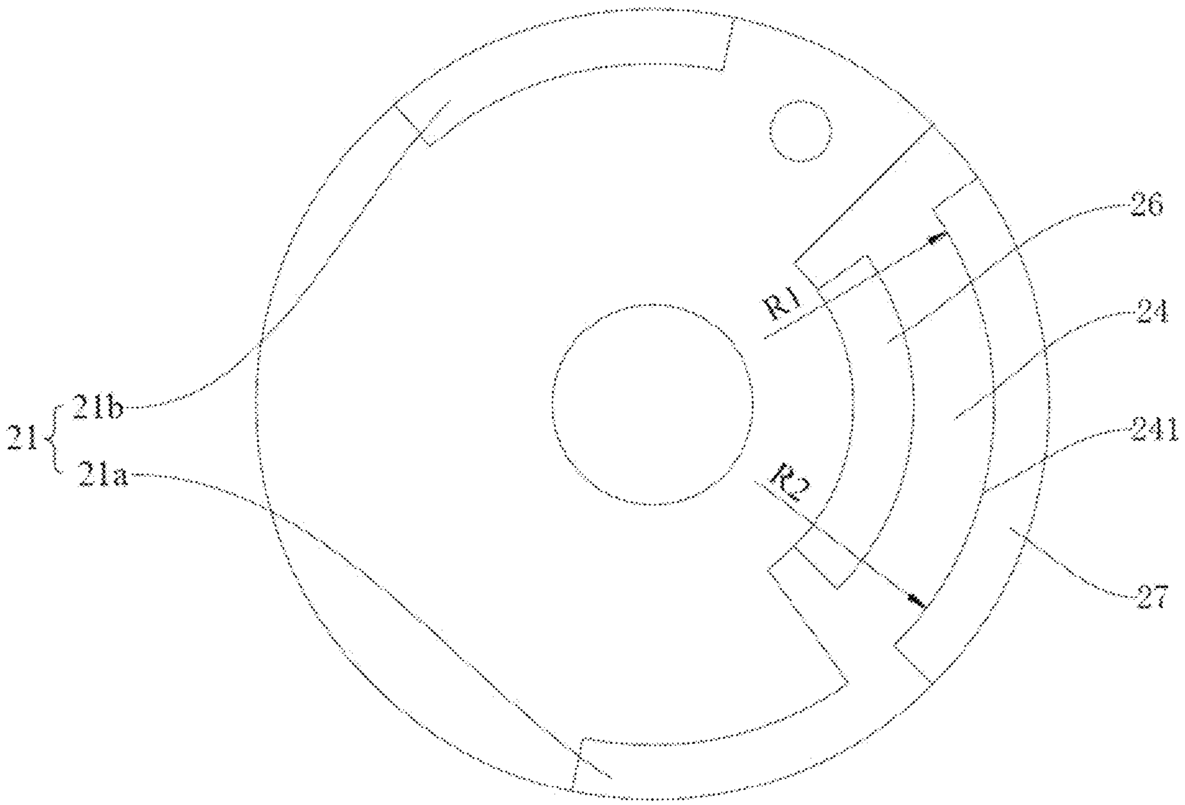
FIG. 12 is an end view of a driven shaft of a transmission device with a reverse braking function according to embodiments of the present technology.

As shown in FIGS. 10 to 12, there are two toggle slots 21, namely, the first toggle slot 21*a* and the second toggle slot 21*b*, and the first toggle slot 21*a* and the second toggle slot 21*b* are spaced apart from each other along the circumferential direction of the driven shaft 2.

Figure 5:
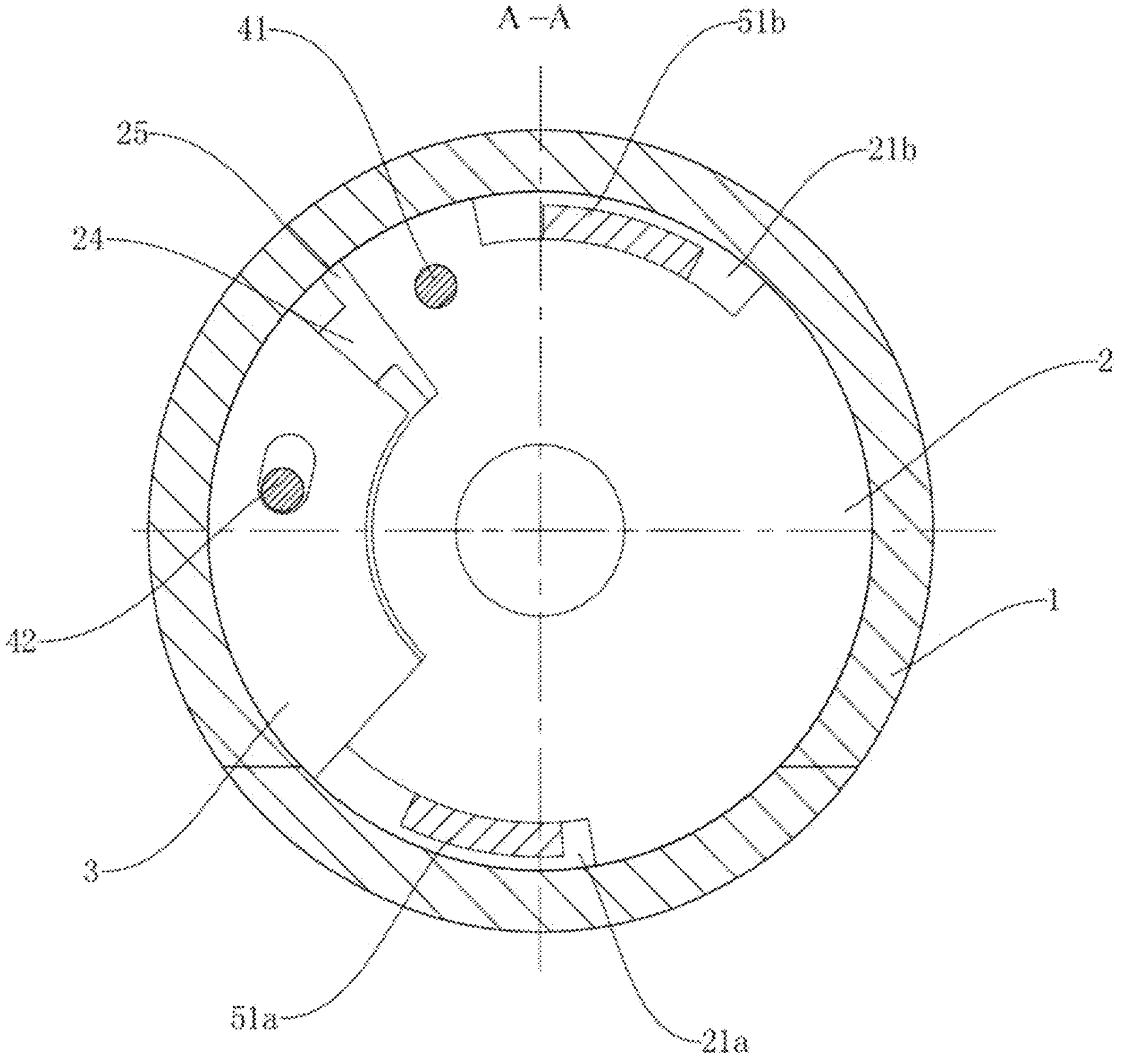
FIG. 5 is a sectional view of a transmission device with a reverse braking function according to embodiments of the present technology taken along line A-A in FIG. 3.
Figure 6:
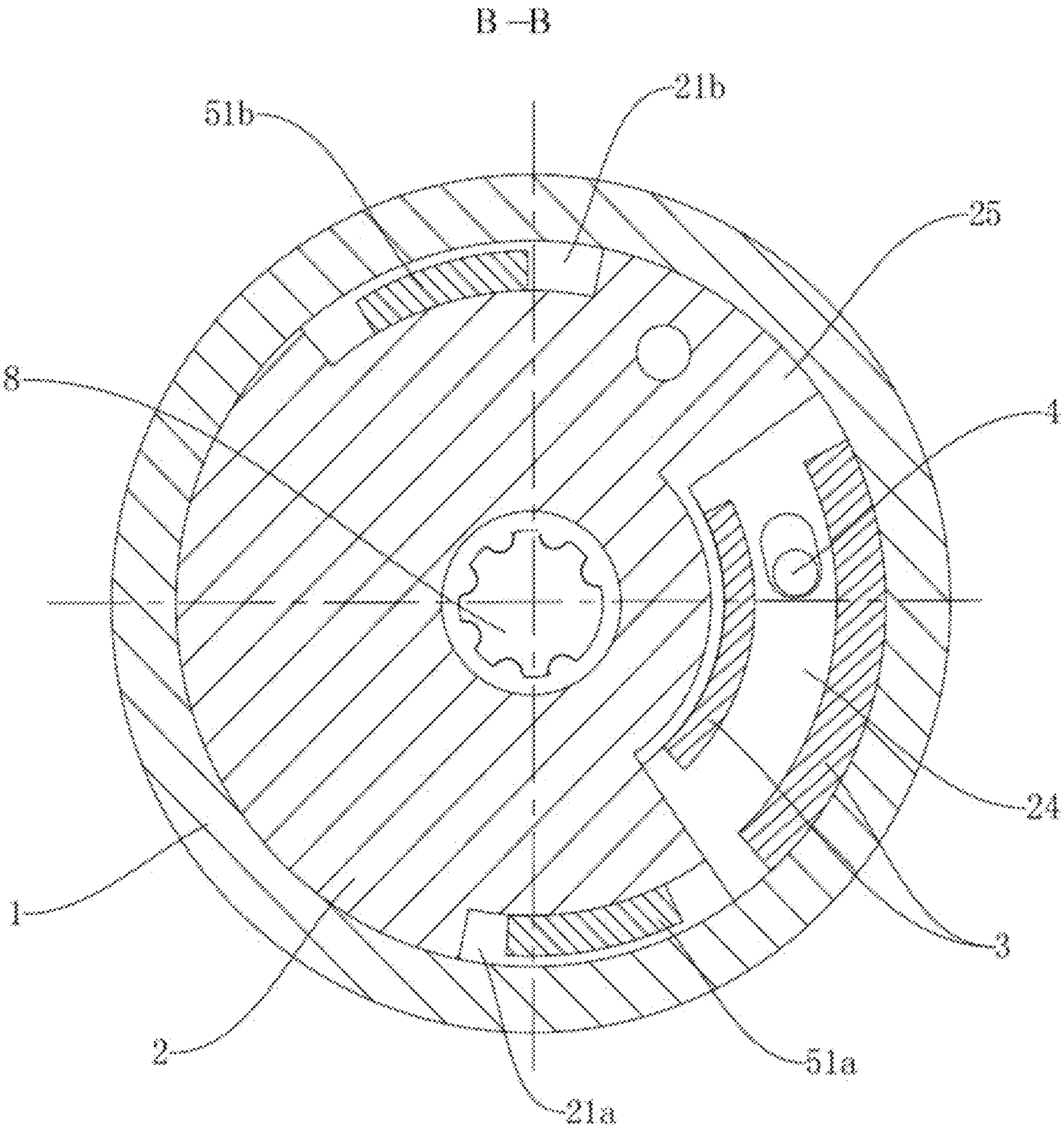
FIG. 6 is a sectional view of a transmission device with a reverse braking function according to embodiments of the present technology taken along line B-B in FIG. 3.

As shown in FIGS. 5 and 6, the toggle block 51 of the drive member 5 is configured as an arc-shaped shape matching the toggle slot 21, and an outer peripheral surface and an inner peripheral surface of the toggle block 51 each are arc-shaped, in which the inner peripheral surface of the toggle block 51 may be slidably fitted in an inner peripheral wall surface of the toggle slot 21, and the inner peripheral surface of the toggle block 51 and an outer peripheral edge of the toggle slot 21 have a gap in a radial direction of the driven shaft 2. It should be understood that the embodiments of the present technology are not limited to this.

In some embodiments, as shown in FIGS. 1 to 3, the transmission device 100 further includes a first cover plate 61 and a second cover plate 62. The first cover plate 61 has a first cover plate hole 611, and the second cover plate 62 has a second cover plate hole 621.

The housing seat 1 has a first end 101 (a right end in FIGS. 3 and 4) and a second end 102 (a left end in FIGS. 3 and 4) opposite to each other in its axial direction. The first cover plate 61 is installed at the first end 101 of the housing seat 1, and the second cover plate 62 is installed at the second end 102 of the housing seat 1.

The first end 22 of the driven shaft 2 is rotatably supported in the seat hole 11 of the housing seat 1, and the second end of the driven shaft 2 extends through the second cover plate hole 621 so as to connect with other components and output power to the other components, such as the drum of the winch.

The drive member 5 is configured as a drive disc, which includes a disc body 52 and a disc hub 53 located at a center of the disc body 52. The toggle block 51 is arranged on the disc body 52 and extends from the disc body 52 towards the driven shaft 2. The disc hub 53 is rotatably supported in the first cover plate hole 611 of the first cover plate 61 by a first bearing 71. The first cover plate 61 and the second cover plate 62 cover two ends of the seat hole 11, and the first end 22 of the driven shaft 2, the brake block 3, the elastic member 4, and the disc body 52 are located in the seat hole 11; thus, these components can be better protected, and the structure of the transmission device 100 is more compact.

As shown in FIGS. 1 to 3, the disc hub 53 is provided with a disc hole 531 suitable for matching with the drive shaft 8, such as a motor shaft of a motor, and the disc hole 531 can pass through the disc hub 53 along an axial direction of the drive member. In some embodiments, the disc hole 531 may be a blind hole. The motor shaft is fitted in the disc hole 531 to drive the drive member 5 to rotate. In an example shown in FIG. 3, the disc hole 531 penetrates the disc hub 53 along an axial direction of the disc hub 53, and an end of the drive shaft 8 is fitted in the disc hole 531 to be coupled to the drive member 5. In an example shown in FIGS. 1 and 2, the disc hole 531 of the drive member 5 is coupled to the drive shaft 8 by a spline, and the disc hub 53 is sleeved with a snap ring 9, which abuts against an outer end face of the first cover plate 61 for limiting the bearing 71 and the drive element 5.

Figure 4:
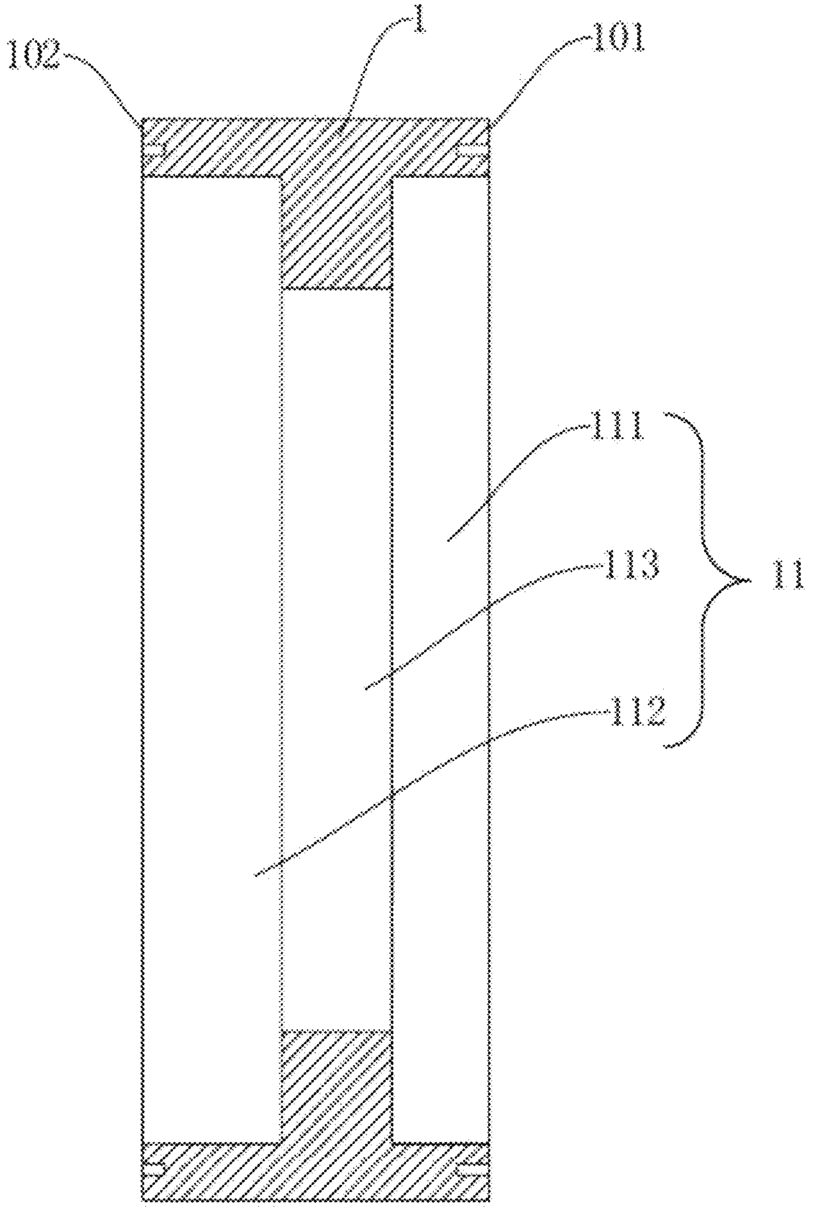
FIG. 4 is an axial sectional view of a housing seat of a transmission device with a reverse braking function according to embodiments of the present technology.

In some embodiments, as shown in FIGS. 3 and 4, the seat hole 11 includes a first seat hole segment 111 adjacent to the first end 101 of the housing seat 1, a second seat hole segment 112 adjacent to the second end 102 of the housing seat 1, and a middle seat hole segment 113 located between the first seat hole segment 111 and the second seat hole segment 112. The first seat hole segment 111 is covered by the first cover plate 61, and the second seat hole segment 112 is covered by the second cover plate 62.

The brake block 3 is located in the middle seat hole segment 113, and in the braking position, the brake block 3 abuts against an inner surface of the middle seat hole segment 113. A second bearing 72 is arranged in the second seat hole segment 112 and is configured to support the driven shaft 2, and the driven shaft 2 is in clearance fit with the middle seat hole segment 113.

As shown in FIG. 3, the second bearing 72 is fitted in the second seat hole segment 112 and is sleeved on the driven shaft 2. Through the support of the second bearing 72, the clearance fit between the driven shaft 2 and the middle seat hole segment 113 is more stable and reliable, avoiding friction between the driven shaft 2 and the housing seat 1.

In an example shown in FIGS. 3 and 4, an inner diameter of the first seat hole segment 111 and an inner diameter of the second seat hole segment 112 each are greater than an inner diameter of the middle seat hole segment 113. The first end 22 of the driven shaft 2 is located in the middle seat hole segment 113 and is in clearance fit with the middle seat hole segment 113 so that the driven shaft 2 can rotate relative to the middle seat hole segment 113. The driven shaft 2 is also in clearance fit with the second cover plate hole 621 of the second cover plate 62 so that the driven shaft 2 can rotate relative to the second cover plate hole 621. A main body section of the elastic member 4 is located in the first seat hole segment 111 and is arranged adjacent to the first end 22 of the driven shaft 2 to facilitate connection with the driven shaft 2 and the brake block 3. The first end 41 and the second end 42 of the elastic member 4 extend a predetermined length in a direction perpendicular to a plane where the main body section is located, respectively. A cavity can be formed between the disc body 52 of the drive member 5 and an end face of the first end 22 of the driven shaft 2 for accommodating the elastic element 4.

In other embodiments, the inner diameter of the first seat hole segment 111 can be equal to the inner diameter of the middle seat hole segment 113, or the inner diameter of the second seat hole segment 112 can be equal to the inner diameter of the middle seat hole segment 113; at the same time, the driven shaft 2 is in clearance fit with the second seat hole segment 112, and the second bearing 72 is not required.

In some embodiments, as shown in FIG. 10, the end face of the first end 22 of the driven shaft 2 is provided with a first insertion hole 23, and the plate body 33 of the brake block 3 is provided with a second insertion hole 31. As shown in FIGS. 1 to 2, the elastic member 4 is an arc-shaped spring; in other words, a main body section of the spring has a roughly open arc-shaped shape, and a first end 41 and a second end 42 of the spring extend in a direction that is generally orthogonal to a plane where the main body section is located, thus facilitating the connection of the first end 41 and the second end 42 of the spring to the brake block 3 and the driven shaft 2, respectively. As shown in FIGS. 5 to 9, the first end 41 of the elastic member 4 is fitted in the first insertion hole 23, and the second end 42 of the elastic member 4 is fitted in the second insertion hole 31 and applies an elastic force T to the brake block 3 to normally press the braking position towards the brake block 3. As shown in FIGS. 7 to 9, in the process of the brake block 3 moving from the braking position towards the release position, the first end 41 and the second end 42 of the elastic member 4 approach each other, and the spring is gradually compressed.

It should be understood that the elastic member 4 is not limited to the rod-shaped spring; for example, it may be an elastic piece or other forms. The connection method between the elastic member 4, the brake block 3, and the driven shaft 2 is not limited to the above embodiments, as long as the elastic member 4 may move the brake block 3 from the release position to the braking position when the drive member 5 stops rotating.

In some embodiments, the first end 22 of the driven shaft 2 is provided with one of a guide rail and a guide groove, the brake block 3 is provided with the other of the guide rail and the guide groove, and the guide rail is slidably fitted in the guide groove. When the brake block 3 moves between the braking position and the release position, the guide rail and the groove slide relative to each other, thus guiding the relative movement between the driven shaft 2 and the brake block 3; that is, the movement of the brake block 3 relative to the driven shaft 2 is more stable and reliable.

In some embodiments, as shown in FIGS. 10 to 14, the guide rail is arranged on the driven shaft 2, the guide groove is in the brake block 3, and the guide rail and the guide groove each have an arc-shaped shape; that is, the guide rail is configured as an arc-shaped guide rail 24, the guide groove is configured as an arc-shaped guide groove 32 matching with the arc-shaped guide rail 24, and the arc-shaped guide rail 24 is slidably fitted in the arc-shaped guide groove 32.

Specifically, as shown in FIGS. 10 to 12, a recess 25 is formed at a junction between the end face of the first end 22 of the driven shaft 2 and an outer peripheral surface of the driven shaft 2; that is, the recess 25 is at an edge of the end face of the first end 22 of the driven shaft 2, and an outer peripheral surface and an upper surface of the recess 25 (a surface corresponding to the end face of the first end of the driven shaft) are open. The recess 25 is recessed from the end face of the first end 22 of the driven shaft 2 towards the second end of the driven shaft 2 and extends along the circumferential direction of the driven shaft 2.

The arc-shaped guide rail 24 is arranged in the recess 25 and extends along the circumferential direction of the driven shaft 2. In the braking position, a part of the brake block 3 may extend above the first toggle slot 21*a* to overlap with a part of the first toggle slot 21*a*, thus facilitating the first toggle block 51*a* fitted in the first toggle slot 21*a* pushing the brake block 3. Specifically, the recess 25 is adjacent to the first toggle slot 21*a* in the circumferential direction of the driven shaft 2, and the recess 25 is in connection with an end of the first toggle slot 21*a* so that the first toggle block 51*a* may be in contact with the brake block 3 and push the brake block 3.

As shown in FIGS. 10 to 12, the recess 25 may be in connection with the first toggle slot 21*a* so that the first toggle block 51*a* fitted in the first toggle slot 21*a* may be in contact with and push the brake block 3.

In some embodiments, the recess 25 may be in connection with the first toggle slot 21*a*, and in the braking position, a part of the brake block 3 overlaps with a part of the first toggle slot 21*a*.

Figure 13:
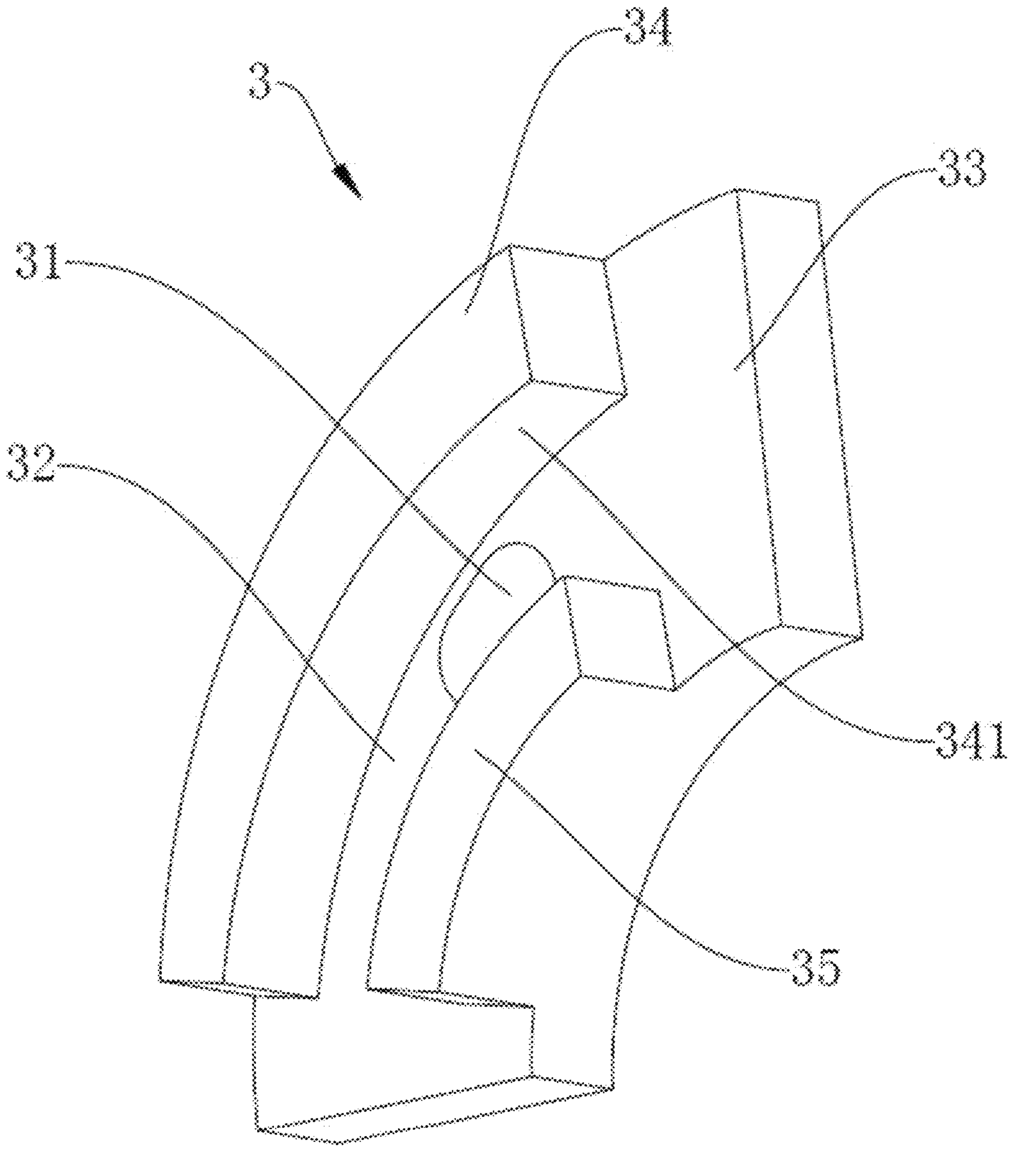
FIG. 13 is a perspective view of a brake block of a transmission device with a reverse braking function according to embodiments of the present technology.
Figure 14:
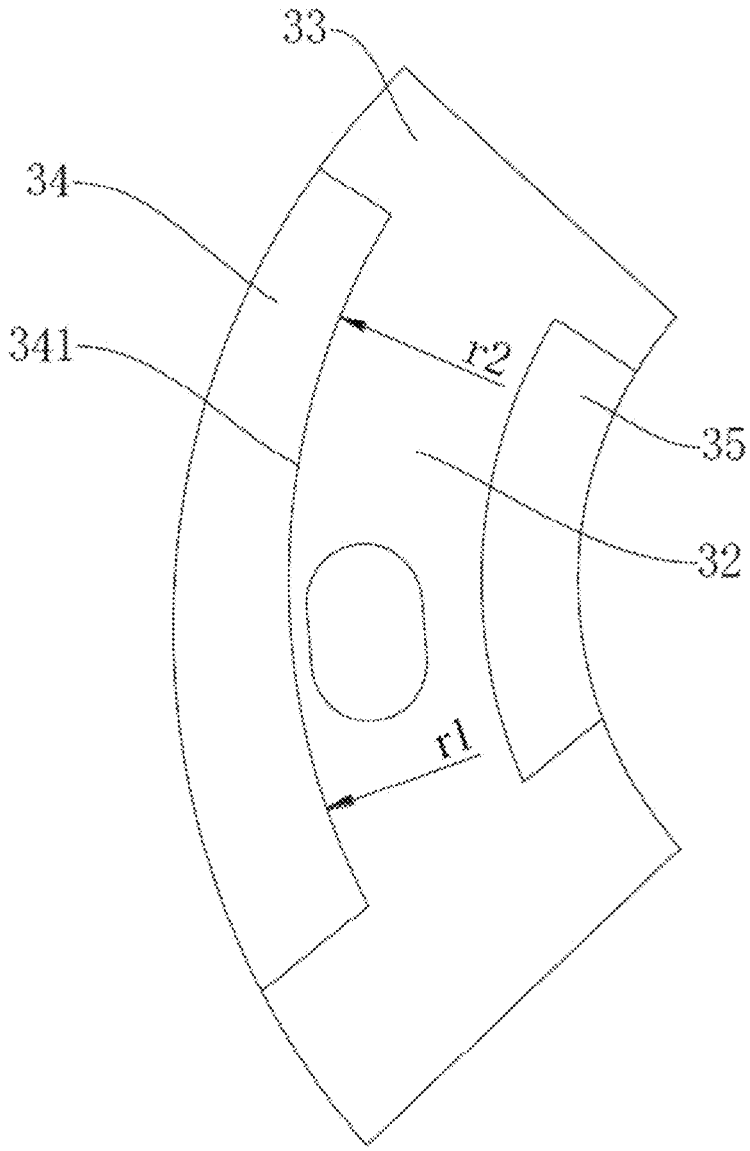
FIG. 14 is a plan view of a brake block of a transmission device with a reverse braking function according to embodiments of the present technology.

As shown in FIGS. 13 and 14, the brake block 3 includes a plate body 33, an outer boss 34, and an inner boss 35. The plate body 33 may have an arc-shaped shape and have an arc-shaped outer peripheral surface and an arc-shaped inner peripheral surface. The plate body 33 has two plate surfaces parallel to each other in its thickness direction; for example, when the brake block 3 is mounted on the driven shaft 2, the plate body 33 has a first plate surface facing the driven shaft 2 and a second plate surface deviating from the driven shaft 2, and the outer boss 34 and the inner boss 35 each are arranged on the first plate surface and extend along a circumferential direction of the plate body 33. The outer boss 34 and the inner boss 35 are spaced apart from each other in a radial direction of the plate body 33, the arc-shaped guide groove 32 is formed between the outer boss 34 and the inner boss 35, an outer peripheral surface of the outer boss 34 is flush with the outer peripheral surface of the plate body 33, and an inner peripheral surface of the inner boss 35 is flush with the inner peripheral surface of the plate body 33.

As shown in FIGS. 3 and 5, the plate body 33 of the brake block 3 is fitted in the recess 25, and the second plate surface of the plate body 33 is flush with the end face of the first end 22 of the driven shaft 2. In the radial direction of the driven shaft 2, the arc-shaped guide rail 24 is located between the outer boss 34 and the inner boss 35 and is slidable relative to the outer boss 34 and the inner boss 35 in the circumferential direction of the driven shaft 2; in other words, the arc-shaped guide rail 24 extends into the arc-shaped guide groove 52 and is slidably fitted in the arc-shaped guide groove.

As shown in FIG. 7, in the braking position, at least part of the outer peripheral surface of the outer boss 34 and at least part of the outer peripheral surface of the plate body 33 exceed the outer peripheral surface of the driven shaft 2 in the radial direction of the driven shaft 2 to abut against the housing seat 1 and, in particular, to abut against a hole wall surface of the middle seat hole segment 113 of the housing seat 1.

As shown in FIG. 14, the outer boss 34 has an opposite first end and second end in the circumferential direction of the plate body 33, the inner boss 35 has an opposite first end and second end in the circumferential direction of the plate body 33, and the plate body 33 has an opposite first end and second end in its circumference. Each of the first end of the outer boss 34 and the first end of the inner boss 35 is adjacent to the first end of the plate body 33 and is spaced apart from the first end of the plate body 33 by a first distance, and each of the second end of the outer boss 34 and the second end of the inner boss 35 is adjacent to the second end of the plate body 53 and is spaced apart from the second end of the plate body 53 by a second distance.

As shown in FIGS. 11 and 12, an inner side of the arc-shaped guide rail 24 has an inner groove 26, and an outer side of the arc-shaped guide rail 24 has an outer groove 27. The inner boss 35 of the brake block 3 is fitted in the inner groove 26 and is slidable along the inner groove 26, and the outer boss 34 of the brake block 3 is fitted in the outer groove 27 and is slidable along the outer groove 27. It should be understood that the inner groove 26 and the outer groove 27 each are an arc-shaped groove, and an outer side and an upper surface of the outer groove 27 are open so that part of the outer boss 34 may extend outwards through the outer groove 27 to abut against the housing seat 1.

Further, the first end of the arc-shaped guide rail 24 has a first step 28, the second end of the arc-shaped guide rail 24 has a second step 29, and the arc-shaped guide rail 24 is located between the first step 28 and the second step 29 in the circumferential direction of the driven shaft 2 and is coupled to the first step 28 and the second step 29. An upper surface of the arc-shaped guide rail 24, an upper surface of the first step 28, and an upper surface of the second step 29 can all be flush with a bottom surface of the first toggle slot 21*a* (also known as a lower surface, namely, a surface away from the end face of the first end of the driven shaft). A bottom of the plate body 33 is slidably fitted to the upper surface of the arc-shaped guide rail 24, the upper surface of the first step 28, and the upper surface of the second step 29.

As shown in FIG. 8, when the driven shaft 2 rotates in the first direction, the first toggle block 51*a* in the first toggle slot 21*a* is in contact with an end face of the plate body 33 to push the brake block 3.

The brake block 3 moves between the release position and the braking position along the arc-shaped guide rail 24 to be separated from or abut against the housing seat 1. In order to more accurately limit the movement path of the brake block 3 and make the braking of the brake block 3 in the braking position more reliable and the release in the release position more reliable, in some embodiments, a curvature radius of an outer peripheral surface 241 of the arc-shaped guide rail 24 may gradually increase along a direction from the release position to the braking position. In some embodiments, the outer peripheral surface 241 of the arc-shaped guide rail 24 may be a cam surface or a spiral surface gradually expanding radially outwards along the circumferential direction of the driven shaft 2.

As an example, as shown in FIG. 12, the curvature radius of the outer peripheral surface 241 of the arc-shaped guide rail 24 gradually increases along the direction from the release position to the braking position, R1 and R2 respectively refer to the curvature radius of the outer peripheral surface 241 of the arc-shaped guide rail 24 at different positions, and a position referred to by the mark R1 in the figure is closer to the release position compared to a position referred to by R2, in which R1 is less than R2.

As shown in FIG. 14, the structure of the outer boss 34 of the brake block 3 is adapted to the structure of the outer groove 27. As shown in FIG. 14, r1 and r2 respectively refer to a curvature radius of an inner peripheral surface 341 of the outer boss 34 at different positions, in which a position referred to by r1 is closer to the release position than a position referred to by r2, and r1 is less than r2.

In some optional embodiments, the transmission device 100 with reverse braking function includes a driven member, a brake member, the elastic member 4, and the drive member. As described above, the driven member may be configured as the driven shaft, the brake member may be configured as the brake block, the elastic member may be configured as the spring, and the drive member may be configured as the drive disc. It should be understood that the embodiments of the present technology are not limited to this.

The brake member is arranged on the driven member to rotate together with the driven member, and the brake member is movable relative to the driven member between the braking position that prevents the driven member from rotating together with the brake member and the release position that allows the driven member to rotate together with the brake member. In other words, in the braking position, the brake member prevents the driven member from rotating together with the brake member, and in the release position, the driven member rotates together with the brake member. The elastic member 4 presses the brake member towards the braking position. The drive member is configured to drive the driven component to rotate; when the drive member rotates, the brake member overcomes the elastic force of the elastic member 4 and moves relative to the driven member from the braking position to the release position; and when the drive member stops rotating, the elastic member 4 pushes the brake member from the release position to the braking position.

The transmission device according to embodiments of the present technology may realize the automatic reverse braking function with an overall structure that is simple, a number of parts that are small, and a volume that is small, and it has the advantages of large braking torque, small braking friction consumption, low cost, and high braking reliability.

In some optional embodiments, the transmission device 100 with reverse braking function includes a rotatable driven member, a brake member, a spring, and a rotatable drive member. As described above, the driven member may be configured as the driven shaft, the brake member may be configured as the brake block, and the drive member may be configured as the drive disc. It should be understood that the embodiments of the present technology are not limited to this.

The brake member is arranged on the driven member and is movable relative to the driven member between the braking position that prevents the driven member from rotating and the release position that allows the driven member to rotate. In order to realize that the brake member prevents the driven member from rotating in the braking position and allows the driven member to rotate in the release position, at least one of the following methods may be adopted. In the radial direction of the driven member, the brake member in the braking position is further away from a rotation center of the driven member than the brake member in the release position; when the brake member moves from the release position towards the braking position, the brake member moves along the circumferential direction of the driven member and moves outwards along the radial direction of the driven member at the same time; and when the brake member moves from the release position towards the braking position, the motion trajectory of the brake member is a spiral or a cam contour gradually expanding radially outwards along the circumferential direction of the driven member.

A first end of the spring is coupled to the brake member, a second end of the spring is coupled to the driven member, and the spring presses the brake member towards the braking position. When the drive member rotates, it causes the brake component to move from the braking position to the release position against the elastic force of the spring to drive the driven member to rotate together with the brake member. When the drive member stops rotating, the spring pushes the brake member from the release position to the braking position to prevent the driven member from rotating together with the brake member.

The transmission device according to example embodiments of the present technology may realize the automatic reverse braking function with an overall structure that is simple, a number of parts that are small, and a volume that is small, and it has the advantages of large braking torque, small braking friction consumption, low cost, and high braking reliability.

A joint module according to example embodiments of the present technology is described below.

Figure 15:
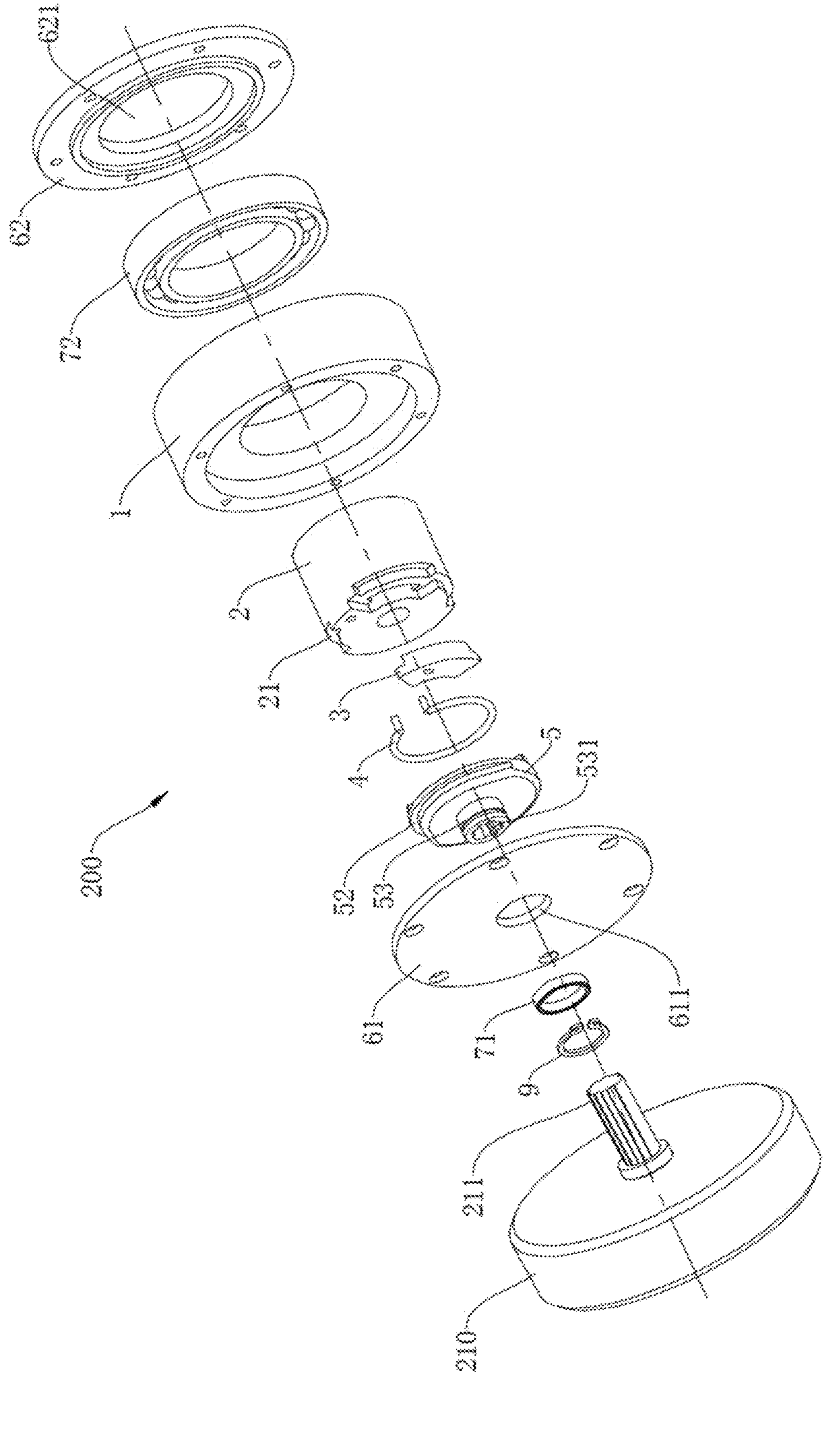
FIG. 15 is a perspective view of a joint module according to embodiments of the present technology.
Figure 16:
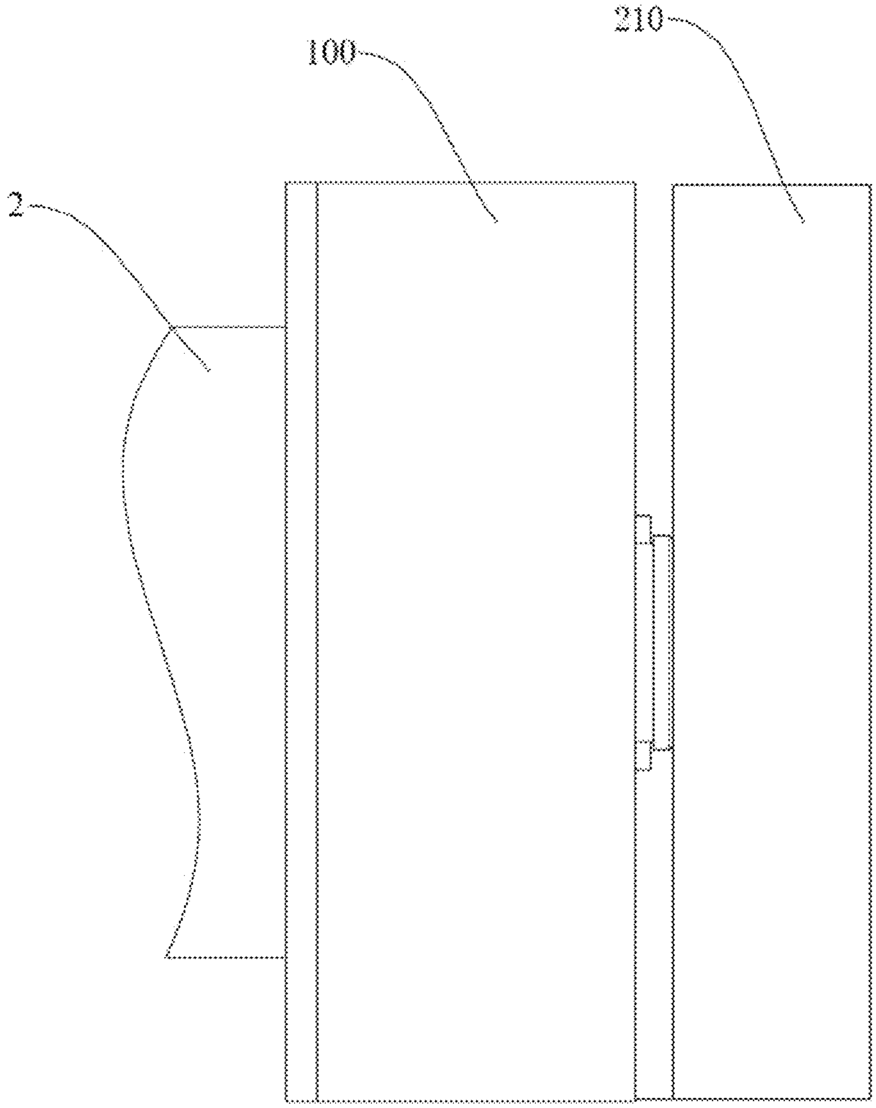
FIG. 16 is a front view of a joint module according to embodiments of the present technology.

As shown in FIGS. 15 and 16, the joint module 200 according to embodiments of the present technology includes a transmission device and a motor 210, and the transmission device may be the transmission device 100 according to any one of the above embodiments. A motor shaft 211 of the motor 210 serves as a drive shaft and is coupled to the drive member 5 of the transmission device 100 to drive the drive member 5 to rotate.

The joint module according to example embodiment of the present technology may automatically realize reverse braking, and when the motor shaft of the motor rotates, the driven shaft is driven to rotate together with the brake block by the drive member. When the motor shaft of the motor stops rotating, the elastic member pushes the brake block relative to the driven shaft from the release position to the braking position, and the brake block abuts against the housing seat, thereby preventing the driven shaft from rotating together with the brake block. That is, the driven shaft cannot rotate under a torque (load) applied to it, so the driven shaft cannot transmit the torque in reverse to the drive member and cause the drive member to rotate.

In some embodiments, as shown in FIGS. 15 and 16, the motor 210 is arranged outside the housing seat 1 of the transmission device 100, and the motor shaft 211 of the motor 210 extends into the disc hole 531 of the disc hub 53 of the drive member 5 to be coupled to the disc hub 53, thereby driving the drive member 5 to rotate.

In an example shown in FIGS. 15 and 16, the motor shaft 211 is coupled to the disc hole 531 by a spline. It should be understood that the embodiments of the present technology are not limited to this.

Figure 17:
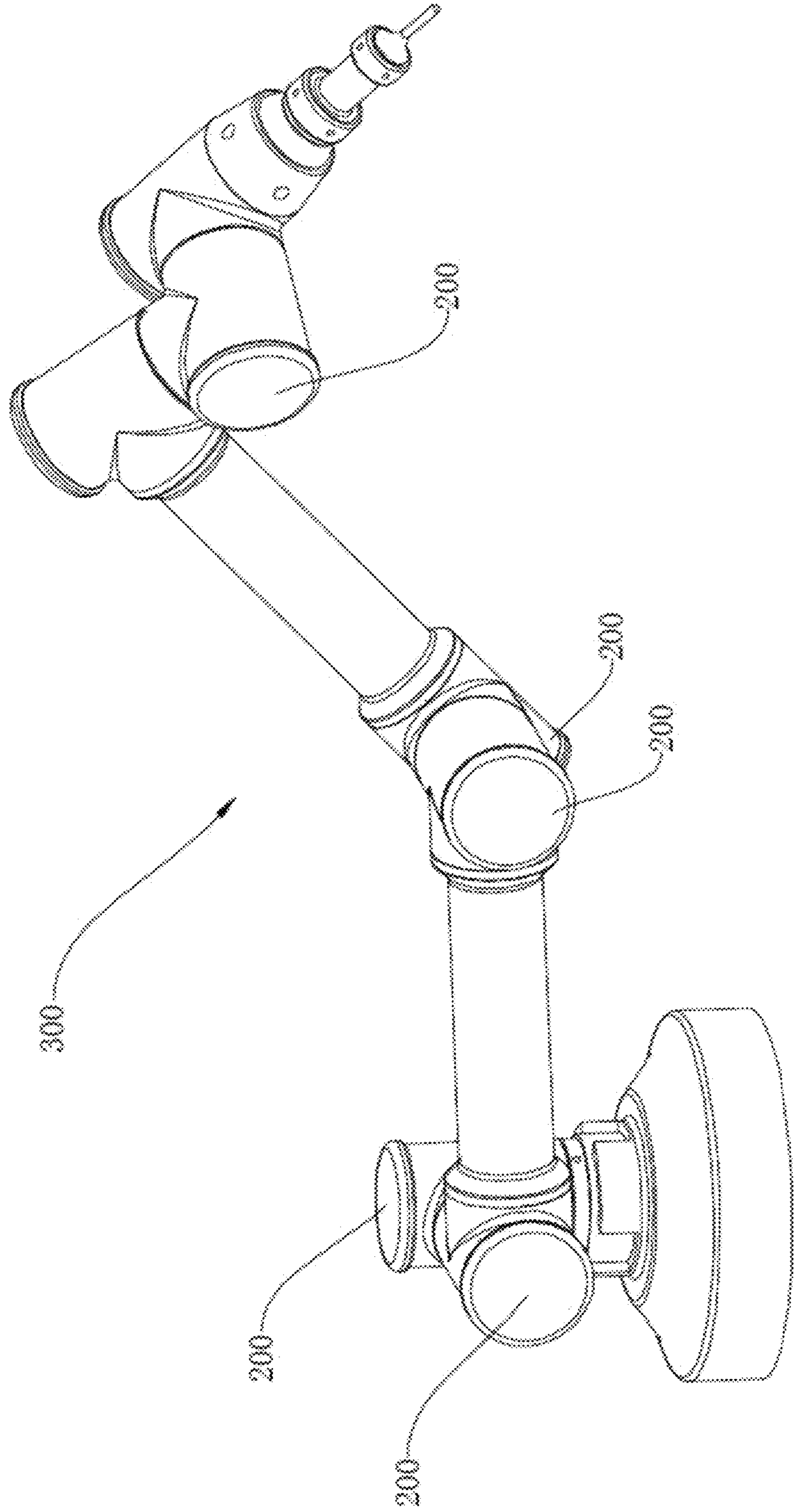
FIG. 17 is a schematic view of a robotic arm according to embodiments of the present technology.

FIG. 17 shows a robotic arm 300 according to some example embodiments of the present technology. The robotic arm 300 includes a plurality of joint modules 200, and the robotic arm 300 may perform various actions and operations under drive of the joint modules 200.

Figure 18:
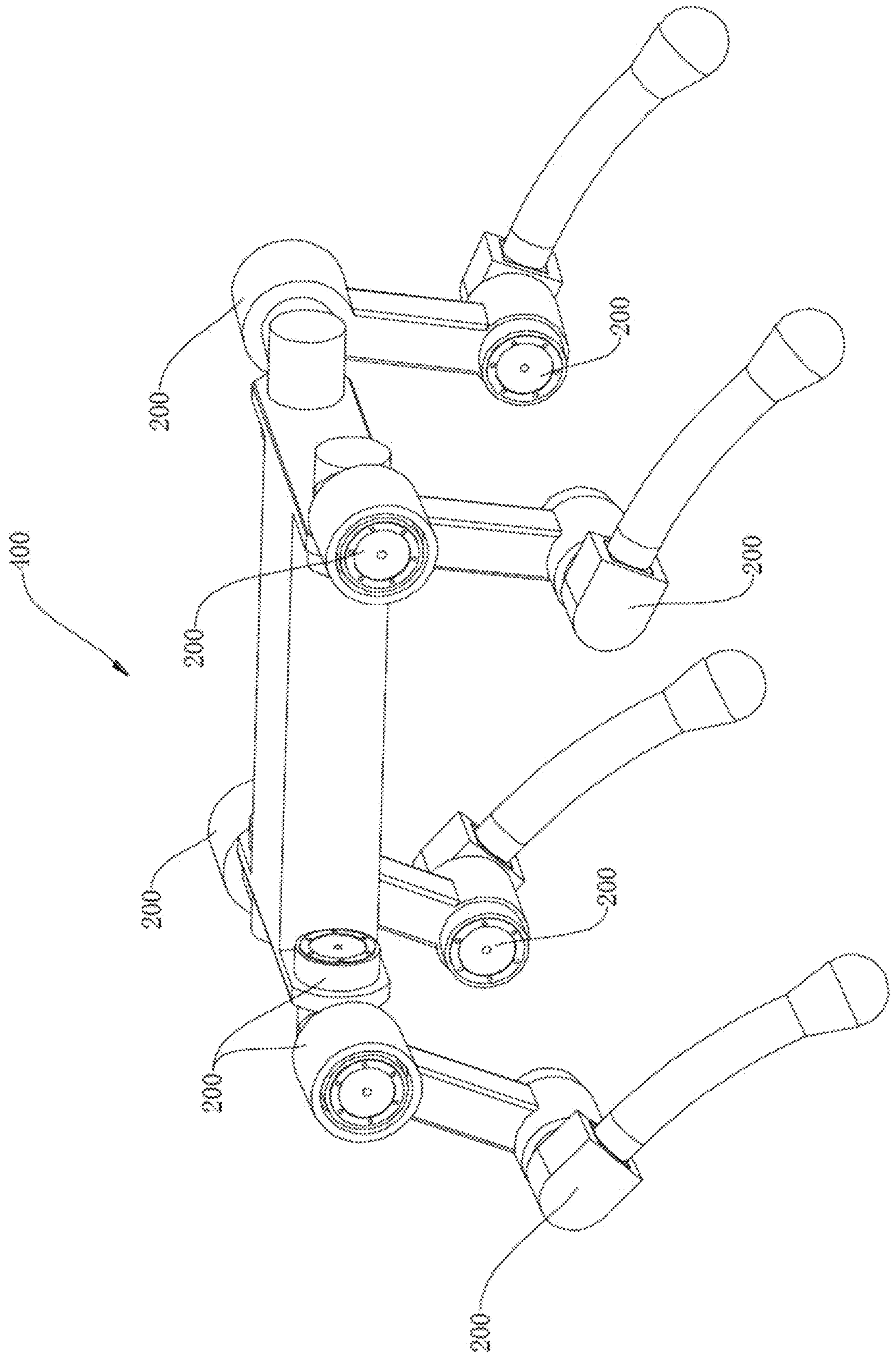
FIG. 18 is a schematic view of a robot according to embodiments of the present technology.

FIG. 18 shows a robot 400 according to some example embodiments of the present technology. The robot 400 includes the joint module 200, and the robot may achieve various actions under drive of the joint module 200.

It should be understood that the robotic arm 300 and the robot 400 according to some example embodiments of the present technology are not limited to the forms shown in the figures.

A production system according to some example embodiments of the present technology may include the robotic arm 300 and/or the robot 400 according to some example embodiments of the present technology. For example, the production system according to some example embodiments of the present technology may be an automobile production line or another product production line, and the robotic arm 300 and/or the robot 400 may be configured to pick up components of the automobile and/or assemble the automobile and its components.

An electric device according to embodiments of the present technology may include the joint module 200 according to embodiments of the present technology.

Figure 19:
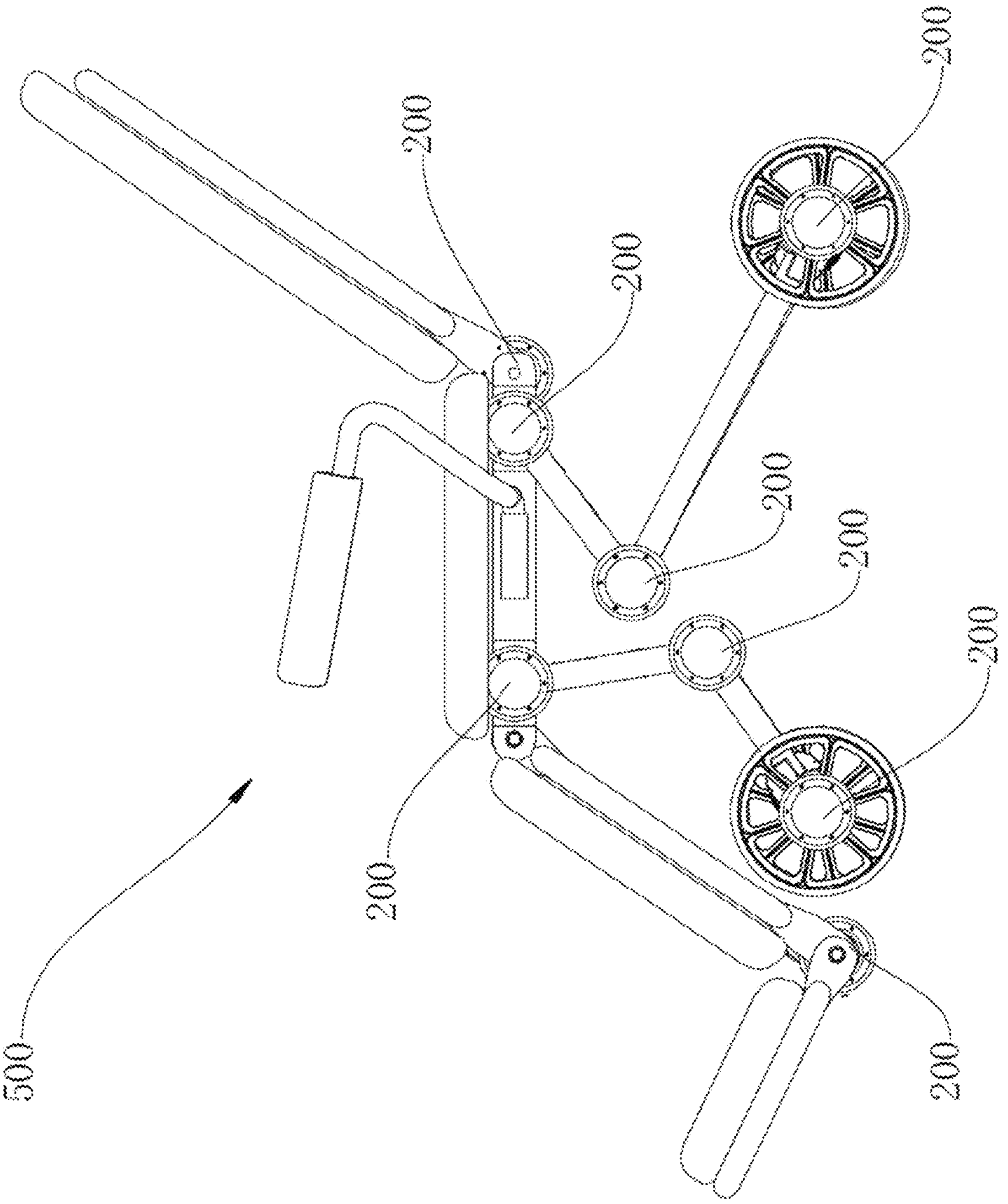
FIG. 19 is a schematic view of an electric device according to embodiments of the present technology.

In some embodiments, the electric device may be an electric wheelchair or an electric bed. For example, as shown in FIG. 19, the electric device according to some example embodiments of the present technology is an electric wheelchair 500, and the electric wheelchair 500 may walk and change its form under drive of the joint module 200.

It should be understood that the electric device according to embodiments of the present disclosure is not limited to the electric bed and the electric wheelchair.

EXAMPLES

In some embodiments in accordance with the present technology (example 1), a transmission device with a reverse braking function includes a housing seat having a seat hole; a driven shaft rotatably coupled with the housing seat and at least partially supported in the seat hole; a brake block arranged on the driven shaft and rotatable together with the driven shaft, the brake block being movable relative to the driven shaft between a braking position where the brake block abuts against the housing seat and a release position where the brake block is separated from the housing seat; an elastic member coupled to the driven shaft and the brake block, the elastic member configured to press the brake block towards the braking position; and a drive member coupled to the driven shaft, wherein, when the drive member rotates, the brake block moves to the release position relative to the driven shaft so that the drive member drives the driven shaft and the brake block to rotate together, and when the drive member stops rotating, the elastic member pushes the brake block to the braking position to prevent the driven shaft and the brake block from rotating together.

Example 2 includes the transmission device according to example 1 or any of examples 1-16, wherein the driven shaft is provided with a toggle slot, and the drive member is provided with a toggle block, and wherein the toggle block is fitted in the toggle slot and is movable along a circumferential direction of the driven shaft; wherein, when the drive member rotates, the toggle block overcomes an elastic force of the elastic member and pushes the brake block to the release position to drive the driven shaft to rotate together with the brake block.

Example 3 includes the transmission device according to example 1 or any of examples 1-16, wherein the driven shaft is provided with a toggle slot, and the drive member is provided with a toggle block, and wherein the toggle block is fitted in the toggle slot and is movable along a circumferential direction of the driven shaft; wherein, when the drive member rotates, the toggle block drives the driven shaft to rotate to make the brake block overcome an elastic force of the elastic member and move to the release position, so that the toggle block drives the driven shaft to rotate together with the brake block.

Example 4 includes the transmission device according to example 2 or any of examples 1-16, wherein the toggle slot is at a junction between an end face of a first end of the driven shaft and an outer peripheral surface of the driven shaft, and the toggle slot is recessed from the end face of the first end of the driven shaft towards a second end of the driven shaft and extends along the circumferential direction of the driven shaft.

Example 5 includes the transmission device according to example 2 or any of examples 1-16, further comprising: a first cover plate and a second cover plate, wherein the first cover plate has a first cover plate hole, the second cover plate has a second cover plate hole, the first cover plate is mounted at a first end of the housing seat, and the second cover plate is mounted at a second end of the housing seat; wherein the drive member is a drive disc and comprises a disc body and a disc hub located at a center of the disc body, and the toggle block is arranged on the disc body; and wherein a first end of the driven shaft is rotatably supported in the seat hole, and a second end of the driven shaft extends out through the second cover plate hole, and the disc hub is rotatably supported in the first cover plate hole by a first bearing.

Example 6 includes the transmission device according to example 5 or any of examples 1-16, wherein the seat hole comprises a first seat hole segment adjacent to the first end of the housing seat, a second seat hole segment adjacent to the second end of the housing seat, and a middle seat hole segment located between the first seat hole segment and the second seat hole segment; wherein the first seat hole segment is covered by the first cover plate, and the second seat hole segment is covered by the second cover plate; and wherein, in the braking position, the brake block abuts against an inner surface of the middle seat hole segment, a second bearing for supporting the driven shaft is arranged in the second seat hole segment, and the driven shaft is in clearance fit with the middle seat hole segment.

Example 7 includes the transmission device according to example 1 or any of examples 1-16, wherein an end face of a first end of the driven shaft is provided with a first insertion hole; the brake block is provided with a second insertion hole; the elastic member is an arc-shaped spring; and the elastic member has a first end fitted in the first insertion hole and a second end fitted in the second insertion hole.

Example 8 includes the transmission device according to example 1 or any of examples 1-16, wherein a first end of the driven shaft is provided with one of a guide rail or a guide groove, the brake block is provided with the other of the guide rail or the guide groove, and the guide rail is slidably fitted in the guide groove.

Example 9 includes the transmission device according to example 8 or any of examples 1-16, wherein the guide rail is arranged on the driven shaft; the guide rail and the guide groove are arc-shaped; and a curvature radius of an outer peripheral surface of the guide rail gradually increases along a direction from the release position to the braking position, or the outer peripheral surface of the guide rail is a cam surface or a spiral surface gradually expanding radially outwards along a circumferential direction of the driven shaft.

Example 10 includes the transmission device according to example 1 or any of examples 1-16, wherein the driven shaft is provided with a first toggle slot and a second toggle slot, wherein the drive member is provided with a first toggle block and a second toggle block, and wherein the first toggle block is fitted in the first toggle slot and is movable along a circumferential direction of the driven shaft, and the second toggle block is fitted in the second toggle slot and is movable along the circumferential direction of the driven shaft; and wherein the brake block corresponds to the first toggle slot, and when the drive member rotates along a first direction, the first toggle block overcomes an elastic force of the elastic member and pushes the brake block to the release position.

Example 11 includes the transmission device according to example 10 or any of examples 1-16, wherein, when the brake block moves to the release position, the second toggle block is spaced apart from or is in contact with an end wall surface of the second toggle slot.

Example 12 includes the transmission device according to example 10 or any of examples 1-16, wherein, when the drive member rotates in a second direction opposite to the first direction, the second toggle block drives the driven shaft to rotate in the second direction, and the brake block overcomes the elastic force of the elastic member and moves to the release position.

Example 13 includes the transmission device according to example 12 or any of examples 1-16, wherein, when the brake block moves to the release position, the first toggle block is spaced apart from or is in contact with an end wall surface of the first toggle slot.

Example 14 includes the transmission device according to example 10 or any of examples 1-16, wherein there is one first toggle slot, one second toggle slot, one first toggle block, one second toggle block, one brake block, and one elastic member.

Example 15 includes the transmission device according to example 10 or any of examples 1-16, wherein a first end of the driven shaft is provided with an arc-shaped guide rail, the brake block is provided with an arc-shaped guide groove, and the arc-shaped guide rail is slidably fitted in the arc-shaped guide groove; and wherein a recess is formed at a junction between an end face of the first end of the driven shaft and an outer peripheral surface of the driven shaft; the arc-shaped guide rail is arranged in the recess; the first toggle slot satisfies at least one of (i) being in connection with the recess or (ii) having a part covered by a part of the brake block to facilitate the first toggle block to push the brake block; and the recess is recessed from the end face of the first end of the driven shaft towards the second end of the driven shaft and extends along the circumferential direction of the driven shaft.

Example 16 includes the transmission device according to example 15 or any of examples 1-16, wherein the brake block comprises an arc-shaped plate body, an arc-shaped outer boss, and an arc-shaped inner boss; wherein the outer boss and the inner boss are arranged on the plate body and extend along a circumferential direction of the plate body, the outer boss and the inner boss are spaced apart from each other in a radial direction of the plate body, the arc-shaped guide groove is formed between the outer boss and the inner boss, an outer peripheral surface of the outer boss is flush with an outer peripheral surface of the plate body, and an inner peripheral surface of the inner boss is flush with an inner peripheral surface of the plate body; and wherein, in the braking position, at least part of the outer peripheral surface of the outer boss and at least part of the outer peripheral surface of the plate body exceed the outer peripheral surface of the driven shaft in a radial direction of the driven shaft to abut against the housing seat; a first end of the outer boss and a first end of the inner boss are spaced apart from a first end of the plate body by a first distance; and a second end of the outer boss and a second end of the inner boss are spaced apart from a second end of the plate body by a second distance.

In some embodiments in accordance with the present technology (example 17), a joint module includes the transmission device according to any of examples 1-16; and a motor, a motor shaft of the motor being coupled to a drive member of the transmission device to drive the drive member to rotate.

In some embodiments in accordance with the present technology (example 18), a robotic arm includes the joint module according to example 17.

In some embodiments in accordance with the present technology (example 19), a transmission device includes a driven member; a brake member arranged on the driven member and rotatable together with the driven member, the brake member being movable relative to the driven member between a braking position that prevents the driven member from rotating together with the brake member and a release position that allows the driven member to rotate together with the brake member; an elastic member configured to press the brake member towards the braking position; and a drive member configured to drive the driven member to rotate, wherein, when the drive member rotates, the brake member overcomes an elastic force of the elastic member and moves relative to the driven member from the braking position to the release position, so that the drive member drives the driven member to rotate together with the brake member; and when the drive member stops rotating, the elastic member pushes the brake member from the release position to the braking position.

In some embodiments in accordance with the present technology (example 20), a transmission device includes a rotatable driven member; a brake member arranged on the driven member, the brake member being movable relative to the driven member between a braking position that prevents the driven member from rotating and a release position that allows the driven member to rotate, wherein in a radial direction of the driven member, the brake member when in the braking position is further away from a rotation center of the driven member than when in the release position; or when the brake member moves from the release position towards the braking position, the brake member moves along a circumferential direction of the driven member and moves outwards along the radial direction of the driven member at the same time; or when the brake member moves from the release position towards the braking position, a motion trajectory of the brake member is a spiral or a cam contour gradually expanding radially outwards along the circumferential direction of the driven member; a spring, having a first end coupled to the brake member and a second end coupled to the driven member, and configured to press the brake member towards the braking position; and a rotatable drive member, wherein when the drive member rotates, the drive member causes the brake member to move from the braking position to the release position against an elastic force of the spring, to drive the driven member to rotate together with the brake member, and when the drive member stops rotating, the spring pushes the brake member from the release position to the braking position to prevent the driven member from rotating together with the brake member.

CONCLUSION

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. For example, an actuator (e.g., to actuate a shaft that drives the drive member 5) may be configured as a motor, and the motor can include a control unit embodying various systems, digital electronic circuitry, or in computer software, firmware, or hardware, which structurally and/or functionally interfaced with the actuator (e.g., motor) of the drive member 5.

Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term “data processing unit” or “data processing apparatus” encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA (field programmable gate array) or ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience of description and do not indicate or imply that the device or element referred to must have a particular orientation or be constructed and operated in a particular orientation. These terms shall not be construed as limitations on the present disclosure.

In addition, terms such as "first" and "second" are used herein for purposes of description and are not intended to indicate or imply relative importance or significance or to imply the number of indicated technical features. Thus, the feature defined with "first" and "second" may include one or more of these features. In the description of the present disclosure, the term "a plurality of" means at least two, e.g., two or three, unless specified otherwise.

In the present disclosure, unless specified or limited otherwise, the terms "mounted," "connected," "coupled," "fixed," and the like are used broadly and may be, for example, fixed connections, detachable connections, or integral connections; mechanical or electrical connections; a mutual connection; direct connections or indirect connections via intervening structures; or an inner connection or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature and may also include an embodiment in which the first feature and the second feature are not in direct contact with each other but are contacted via an additional feature formed therebetween. Furthermore, a first feature "on," "above," or "on top of" a second feature may include an embodiment in which the first feature is right or obliquely "on," "above," or "on top of" the second feature or just means that the first feature is at a height higher than that of the second feature, while a first feature "below," "under," or "on bottom of" a second feature may include an embodiment in which the first feature is right or obliquely "below," "under," or "on bottom of" the second feature or just means that the first feature is at a height lower than that of the second feature.

References throughout this specification to "an embodiment," "some embodiments," "an example," "a specific example," or "some examples" mean that a particular feature, structure, material, or characteristic described in connection with the embodiment or example is included in at least one embodiment or example of the present technology. Thus, the appearances of the phrases in various places throughout this specification are not necessarily referring to the same embodiment or example of the present technology. Furthermore, the particular features, structures, materials, or characteristics may be combined in any suitable manner in one or more embodiments or examples. Moreover, different embodiments or examples, as well as features in different embodiments or examples described in this specification, may be combined and united by those skilled in the art in case of no mutual contradiction.

Although some embodiments have been shown and described, it would be appreciated by those skilled in the art that the above embodiments are exemplary and cannot be construed to limit the present technology, and changes, modifications, alternatives, and variations can be made in the embodiments without departing from the scope of the present technology.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A transmission device with a reverse braking function, comprising:
   - a housing seat having a seat hole;
   - a driven shaft rotatably coupled with the housing seat and at least partially supported in the seat hole;
   - a brake block arranged on the driven shaft and rotatable together with the driven shaft, the brake block being movable relative to the driven shaft between a braking position where the brake block abuts against the housing seat and a release position where the brake block is separated from the housing seat;
   - an elastic member coupled to the driven shaft and the brake block, the elastic member configured to press the brake block towards the braking position; and
   - a drive member coupled to the driven shaft, wherein, when the drive member rotates, the brake block moves to the releasef position relative to the driven shaft so that the drive member drives the driven shaft and the brake block orito rotate together, and when the drive member stops rotating, the elastic member pushes the brake block to the braking position to prevent the driven shaft and the brake block from rotating together.

2. The transmission device according to claim 1, wherein the driven shaft is provided with a toggle slot, and the drive member is provided with a toggle block, and wherein the toggle block is fitted in the toggle slot and is movable along a circumferential direction of the driven shaft;
   - wherein, when the drive member rotates, the toggle block overcomes an elastic force of the elastic member and pushes the brake block to the release position to drive the driven shaft to rotate together with the brake block.

3. The transmission device according to claim 1, wherein the driven shaft is provided with a toggle slot, and the drive member is provided with a toggle block, and wherein the toggle block is fitted in the toggle slot and is movable along a circumferential direction of the driven shaft;
   - wherein, when the drive member rotates, the toggle block drives the driven shaft to rotate to make the brake block overcome an elastic force of the elastic member and move to the release position, so that the toggle block drives the driven shaft to rotate together with the brake block.

4. The transmission device according to claim 2, wherein the toggle slot is at a junction between an end face of a first end of the driven shaft and an outer peripheral surface of the driven shaft, and the toggle slot is recessed from the end face of the first end of the driven shaft towards a second end of the driven shaft and extends along the circumferential direction of the driven shaft.

5. The transmission device according to claim 2, further comprising:
   - a first cover plate and a second cover plate, wherein the first cover plate has a first cover plate hole, the second cover plate has a second cover plate hole, the first cover plate is mounted at a first end of the housing seat, and the second cover plate is mounted at a second end of the housing seat;
   - wherein the drive member is a drive disc and comprises a disc body and a disc hub located at a center of the disc body, and the toggle block is arranged on the disc body; and
   - wherein a first end of the driven shaft is rotatably supported in the seat hole, and a second end of the driven shaft extends out through the second cover plate hole, and the disc hub is rotatably supported in the first cover plate hole by a first bearing.

6. The transmission device according to claim 5, wherein the seat hole comprises a first seat hole segment adjacent to the first end of the housing seat, a second seat hole segment adjacent to the second end of the housing seat, and a middle seat hole segment located between the first seat hole segment and the second seat hole segment; wherein the first seat hole segment is covered by the first cover plate, and the second seat hole segment is covered by the second cover plate; and wherein, in the braking position, the brake block abuts against an inner surface of the middle seat hole segment, a second bearing for supporting the driven shaft is arranged in the second seat hole segment, and the driven shaft is in clearance fit with the middle seat hole segment.

7. The transmission device according to claim 1, wherein an end face of a first end of the driven shaft is provided with a first insertion hole; the brake block is provided with a second insertion hole; the elastic member is an arc-shaped spring; and the elastic member has a first end fitted in the first insertion hole and a second end fitted in the second insertion hole.

8. The transmission device according to claim 1, wherein a first end of the driven shaft is provided with one of a guide rail or a guide groove, the brake block is provided with the other of the guide rail or the guide groove, and the guide rail is slidably fitted in the guide groove.

9. The transmission device according to claim 8, wherein the guide rail is arranged on the driven shaft; the guide rail and the guide groove are arc-shaped; and a curvature radius of an outer peripheral surface of the guide rail gradually increases along a direction from the release position to the braking position, or the outer peripheral surface of the guide rail is a cam surface or a spiral surface gradually expanding radially outwards along a circumferential direction of the driven shaft.

10. The transmission device according to claim 1, wherein the driven shaft is provided with a first toggle slot and a second toggle slot, wherein the drive member is provided with a first toggle block and a second toggle block, and wherein the first toggle block is fitted in the first toggle slot and is movable along a circumferential direction of the driven shaft, and the second toggle block is fitted in the second toggle slot and is movable along the circumferential direction of the driven shaft; and
   - wherein the brake block corresponds to the first toggle slot, and when the drive member rotates along a first direction, the first toggle block overcomes an elastic force of the elastic member and pushes the brake block to the release position.

11. The transmission device according to claim 10, wherein, when the brake block moves to the release position, the second toggle block is spaced apart from an end wall surface of the second toggle slot.

12. The transmission device according to claim 10, wherein, when the drive member rotates in a second direction opposite to the first direction, the second toggle block drives the driven shaft to rotate in the second direction, and the brake block overcomes the elastic force of the elastic member and moves to the release position.

13. The transmission device according to claim 12, wherein, when the brake block moves to the release position, the first toggle block is spaced apart from an end wall surface of the first toggle slot.

14. The transmission device according to claim 10, wherein there is one first toggle slot, one second toggle slot, one first toggle block, one second toggle block, one brake block, and one elastic member.

15. The transmission device according to claim 10, wherein a first end of the driven shaft is provided with an arc-shaped guide rail, the brake block is provided with an arc-shaped guide groove, and the arc-shaped guide rail is slidably fitted in the arc-shaped guide groove; and wherein a recess is formed at a junction between an end face of the first end of the driven shaft and an outer peripheral surface of the driven shaft; the arc-shaped guide rail is arranged in the recess; the first toggle slot satisfies at least one of (i) being in connection with the recess or (ii) having a part covered by a part of the brake block to facilitate the first toggle block to push the brake block; and the recess is recessed from the end face of the first end of the driven shaft towards the second end of the driven shaft and extends along the circumferential direction of the driven shaft.

16. The transmission device according to claim 15, wherein the brake block comprises an arc-shaped plate body, an arc-shaped outer boss, and an arc-shaped inner boss; wherein the outer boss and the inner boss are arranged on the plate body and extend along a circumferential direction of the plate body, the outer boss and the inner boss are spaced apart from each other in a radial direction of the plate body, the arc-shaped guide groove is formed between the outer boss and the inner boss, an outer peripheral surface of the outer boss is flush with an outer peripheral surface of the plate body, and an inner peripheral surface of the inner boss is flush with an inner peripheral surface of the plate body; and wherein, in the braking position, at least part of the outer peripheral surface of the outer boss and at least part of the outer peripheral surface of the plate body exceed the outer peripheral surface of the driven shaft in a radial direction of the driven shaft to abut against the housing seat; a first end of the outer boss and a first end of the inner boss are spaced apart from a first end of the plate body by a first distance; and a second end of the outer boss and a second end of the inner boss are spaced apart from a second end of the plate body by a second distance.

17. A joint module, comprising:

the transmission device according to claim 1; and a motor, a motor shaft of the motor being coupled to the drive member of the transmission device to drive the drive member to rotate.

18. A robotic arm, comprising the joint module according to claim 17.

19. A transmission device, comprising:

a driven member;

a brake member arranged on the driven member and rotatable together with the driven member, the brake member being movable relative to the driven member between a braking position that prevents the driven member from rotating together with the brake member and a release position that allows the driven member to rotate together with the brake member;

an elastic member configured to press the brake member towards the braking position; and a drive member configured to drive the driven member to rotate, wherein, when the drive member rotates, the brake member overcomes an elastic force of the elastic member and moves relative to the driven member from the braking position to the release position, so that the drive member drives the driven member to rotate together with the brake member; and when the drive member stops rotating, the elastic member pushes the brake member from the release position to the braking position.

20. A transmission device, comprising:

a rotatable driven member;

a brake member arranged on the driven member, the brake member being movable relative to the driven member between a braking position that prevents the driven member from rotating and a release position that allows the driven member to rotate, wherein in a radial direction of the driven member, the brake member when in the braking position is further away from a rotation center of the driven member than when in the release position; or when the brake member moves from the release position towards the braking position, the brake member moves along a circumferential direction of the driven member and moves outwards along the radial direction of the driven member at the same time; or when the brake member moves from the release position towards the braking position, a motion trajectory of the brake member is a spiral or a cam contour gradually expanding radially outwards along the circumferential direction of the driven member;

a spring, having a first end coupled to the brake member and a second end coupled to the driven member, and configured to press the brake member towards the braking position; and a rotatable drive member, wherein when the drive member rotates, the drive member causes the brake member to move from the braking position to the release position against an elastic force of the spring, to drive the driven member to rotate together with the brake member, and when the drive member stops rotating, the spring pushes the brake member from the release position to the braking position to prevent the driven member from rotating together with the brake member.

* * * * *